(12) United States Patent
Mancuso

(10) Patent No.: US 12,116,846 B2
(45) Date of Patent: Oct. 15, 2024

(54) PASSIVE ROTATION DISCONNECT

(71) Applicant: NATIONAL OILWELL VARCO, L.P., Houston, TX (US)

(72) Inventor: Dominick Mancuso, Tomball, TX (US)

(73) Assignee: NATIONAL OILWELL VARCO, L.P., Houston, TX (US)

( * ) Notice: Subject to any disclaimer, the term of this patent is extended or adjusted under 35 U.S.C. 154(b) by 0 days.

(21) Appl. No.: 17/907,705

(22) PCT Filed: Apr. 30, 2021

(86) PCT No.: PCT/US2021/070488
§ 371 (c)(1),
(2) Date: Sep. 29, 2022

(87) PCT Pub. No.: WO2021/226622
PCT Pub. Date: Nov. 11, 2021

(65) Prior Publication Data
US 2023/0119621 A1 Apr. 20, 2023

Related U.S. Application Data

(60) Provisional application No. 63/019,366, filed on May 3, 2020.

(51) Int. Cl.
*E21B 17/02* (2006.01)
*B23B 31/107* (2006.01)

(52) U.S. Cl.
CPC ........ *E21B 17/021* (2013.01); *B23B 31/1071* (2013.01)

(58) Field of Classification Search
CPC ......... Y10T 403/32434; Y10T 403/592; B23B 31/107; B23B 31/1071
See application file for complete search history.

(56) References Cited

U.S. PATENT DOCUMENTS

| 1,386,210 A | 8/1921 | Thomas |
| 1,494,524 A | 5/1924 | Adamson |
| 1,818,278 A | 8/1931 | Siler |
| 2,109,344 A | 2/1938 | Selger |
| 2,314,867 A | 3/1943 | Boynton |
| 2,531,930 A | 11/1950 | Woolslayer et al. |

(Continued)

FOREIGN PATENT DOCUMENTS

| CA | 2911388 A1 | 11/2014 |
| CA | 2855105 A1 | 12/2015 |

(Continued)

OTHER PUBLICATIONS

"U.S. Appl. No. 17/305,299, Response filed Feb. 1, 2023 to Final Office Action mailed Dec. 9, 2022", 9 pgs.

(Continued)

*Primary Examiner* — Daniel J Wiley
(74) *Attorney, Agent, or Firm* — Schwegman Lundberg & Woessner, P.A.

(57) ABSTRACT

A coupling mechanism for securing a tool to a tool arm may include a housing and an engaging lock. The engaging lock may be arranged within the housing and configured for rotation by the tool arm. Rotation of the engaging lock may drive locking mechanisms partially through the housing to establish a longitudinally secured connection.

20 Claims, 18 Drawing Sheets

(56) References Cited

U.S. PATENT DOCUMENTS

| Patent/Pub No. | Date | Name |
|---|---|---|
| 2,615,681 A | 10/1952 | True |
| 2,735,556 A | 2/1956 | Stone |
| 2,810,145 A | 10/1957 | Forrow |
| 2,885,096 A | 5/1959 | Medearis |
| 2,946,464 A | 7/1960 | Guier |
| 3,225,949 A | 12/1965 | Erickson et al. |
| 3,272,365 A | 9/1966 | Stevens |
| 3,361,453 A | 1/1968 | Brown et al. |
| 3,533,516 A | 10/1970 | Guier |
| 3,615,027 A | 10/1971 | Ham |
| 3,623,753 A | 11/1971 | Henry |
| 3,747,789 A | 7/1973 | Shipley et al. |
| 3,768,663 A | 10/1973 | Turner, Jr. et al. |
| 3,840,128 A | 10/1974 | Swoboda et al. |
| 3,877,583 A | 4/1975 | Bokenkamp |
| 3,921,823 A | 11/1975 | Bourree et al. |
| 3,976,207 A | 8/1976 | Schultz |
| 3,994,350 A | 11/1976 | Smith et al. |
| 4,042,123 A | 8/1977 | Sheldon et al. |
| 4,117,941 A | 10/1978 | McCleskey, Jr. et al. |
| 4,126,348 A | 11/1978 | Palmer |
| 4,213,237 A | 7/1980 | Whiting |
| 4,269,554 A | 5/1981 | Jackson |
| 4,274,778 A | 6/1981 | Putnam et al. |
| 4,289,442 A | 9/1981 | Stevens |
| 4,348,920 A | 9/1982 | Boyadjieff |
| 4,397,605 A | 8/1983 | Cowgill et al. |
| 4,531,875 A | 7/1985 | Krueger |
| 4,591,006 A | 5/1986 | Hutchison et al. |
| 4,599,778 A | 7/1986 | Dreyfuss et al. |
| 4,621,974 A | 11/1986 | Krueger |
| 4,680,519 A | 7/1987 | Chand et al. |
| 4,697,830 A | 10/1987 | Wood et al. |
| 4,715,761 A | 12/1987 | Berry et al. |
| 4,738,321 A | 4/1988 | Olivier |
| 4,846,357 A | 7/1989 | Sholl et al. |
| 4,899,095 A | 2/1990 | Kishi et al. |
| 5,038,871 A | 8/1991 | Dinsdale |
| 5,211,251 A | 5/1993 | Woolslayer |
| 5,494,320 A | 2/1996 | Cerruti |
| 5,813,286 A | 9/1998 | Hansen |
| 5,921,329 A | 7/1999 | Armstrong |
| 6,047,771 A | 4/2000 | Roeynestad |
| 6,260,646 B1 | 7/2001 | Fernandez et al. |
| 6,412,576 B1 | 7/2002 | Meiners |
| 7,137,616 B2 | 11/2006 | Kysely |
| 7,249,639 B2 | 7/2007 | Belik |
| 7,341,281 B2 | 3/2008 | Guesnon et al. |
| 7,370,707 B2 | 5/2008 | McDaniel et al. |
| 7,390,032 B2 | 6/2008 | Hughes |
| 7,493,960 B2 | 2/2009 | Leising et al. |
| 7,726,929 B1 | 6/2010 | Orgeron |
| 7,905,311 B2 | 3/2011 | Brown |
| 7,946,795 B2 | 5/2011 | Orgeron |
| 7,984,757 B1 | 7/2011 | Keast et al. |
| 8,074,484 B2 | 12/2011 | Denkmeier et al. |
| 8,191,637 B2 | 6/2012 | Havinga |
| 8,210,269 B2 | 7/2012 | Hudson et al. |
| 8,317,448 B2 | 11/2012 | Hankins et al. |
| 8,504,206 B2 | 8/2013 | Fudaba et al. |
| 8,550,761 B2 | 10/2013 | Belik et al. |
| 8,690,508 B1 | 4/2014 | Orgeron |
| 8,794,418 B1* | 8/2014 | Norton ............... B25J 17/0208 901/29 |
| 9,133,968 B2 | 9/2015 | Elrick et al. |
| 9,291,010 B1 | 3/2016 | Barnes |
| 9,388,923 B2 | 7/2016 | Romano |
| 10,047,908 B1 | 8/2018 | Bohle, II et al. |
| 10,053,934 B2 | 8/2018 | Keogh et al. |
| 10,246,952 B2 | 4/2019 | Trydal et al. |
| 10,384,907 B2 | 8/2019 | Upmeier et al. |
| 10,794,126 B2 | 10/2020 | Magnuson |
| 10,995,564 B2 | 5/2021 | Miller et al. |
| 11,035,183 B2 | 6/2021 | Donnally et al. |
| 11,220,888 B2 | 1/2022 | Ocegueda-Hernandez et al. |
| 11,274,508 B2 | 3/2022 | McKenzie et al. |
| 11,814,911 B2 | 11/2023 | Saunders et al. |
| 2002/0175519 A1 | 11/2002 | Mack et al. |
| 2003/0159854 A1 | 8/2003 | Simpson et al. |
| 2004/0049905 A1 | 3/2004 | Jansch et al. |
| 2004/0057815 A1 | 3/2004 | Woolslayer et al. |
| 2005/0055132 A1 | 3/2005 | Matsumoto et al. |
| 2005/0113971 A1 | 5/2005 | Zhang et al. |
| 2005/0126792 A1 | 6/2005 | Berry |
| 2006/0081379 A1 | 4/2006 | Fehres et al. |
| 2006/0104747 A1 | 5/2006 | Zahn et al. |
| 2006/0124316 A1 | 6/2006 | Pietras |
| 2006/0231344 A1 | 10/2006 | Drzewiecki |
| 2006/0249292 A1 | 11/2006 | Guidry |
| 2007/0062705 A1 | 3/2007 | Schats et al. |
| 2007/0114069 A1 | 5/2007 | Hooper et al. |
| 2007/0228671 A1* | 10/2007 | Norton ............... B23B 31/1071 279/2.11 |
| 2008/0136203 A1 | 6/2008 | Krijnen et al. |
| 2008/0202812 A1 | 8/2008 | Childers et al. |
| 2008/0238095 A1 | 10/2008 | Yater et al. |
| 2008/0296065 A1 | 12/2008 | Standal |
| 2009/0283324 A1 | 11/2009 | Konduc et al. |
| 2010/0163247 A1 | 7/2010 | Wright et al. |
| 2010/0193198 A1 | 8/2010 | Murray et al. |
| 2010/0303586 A1 | 12/2010 | Hankins et al. |
| 2011/0079434 A1 | 4/2011 | Belik et al. |
| 2011/0120730 A1 | 5/2011 | Clasen et al. |
| 2011/0147009 A1 | 6/2011 | Dupal et al. |
| 2011/0226485 A1 | 9/2011 | Seneviratne et al. |
| 2012/0018222 A1 | 1/2012 | Hankins et al. |
| 2012/0259337 A1 | 10/2012 | del Rio et al. |
| 2013/0075114 A1 | 3/2013 | Dekker et al. |
| 2013/0142607 A1 | 6/2013 | Ditzler |
| 2013/0146305 A1 | 6/2013 | Dupal et al. |
| 2014/0050522 A1 | 2/2014 | Slaughter, Jr. et al. |
| 2014/0054089 A1 | 2/2014 | Sondervik |
| 2014/0083676 A1 | 3/2014 | Miner |
| 2014/0097027 A1 | 4/2014 | Marica et al. |
| 2014/0145408 A1 | 5/2014 | Midas et al. |
| 2014/0202769 A1 | 7/2014 | Magnuson |
| 2015/0053424 A1 | 2/2015 | Wiens et al. |
| 2015/0127152 A1 | 5/2015 | Nammoto et al. |
| 2015/0148952 A1 | 5/2015 | Shiratsuchi |
| 2015/0176349 A1 | 6/2015 | Belik |
| 2015/0232272 A1 | 8/2015 | Magnuson |
| 2015/0272579 A1 | 10/2015 | Leimbach et al. |
| 2015/0273688 A1 | 10/2015 | Harada et al. |
| 2015/0275596 A1 | 10/2015 | Hickie |
| 2015/0283704 A1 | 10/2015 | Watanabe |
| 2015/0330162 A1 | 11/2015 | Magnuson et al. |
| 2016/0060979 A1 | 3/2016 | Magnuson |
| 2016/0115745 A1 | 4/2016 | Bisel |
| 2016/0145954 A1 | 5/2016 | Helms et al. |
| 2016/0160586 A1 | 6/2016 | Keogh et al. |
| 2016/0168929 A1 | 6/2016 | Magnuson et al. |
| 2016/0201408 A1 | 7/2016 | Little et al. |
| 2017/0172295 A1 | 6/2017 | Tropper |
| 2017/0204687 A1 | 7/2017 | Yorga et al. |
| 2017/0232620 A1* | 8/2017 | Kalb ................... B25J 15/0416 279/2.09 |
| 2017/0234088 A1 | 8/2017 | Orr et al. |
| 2018/0171724 A1 | 6/2018 | Daigle et al. |
| 2018/0238120 A1 | 8/2018 | Patterson et al. |
| 2018/0245408 A1 | 8/2018 | Keogh et al. |
| 2018/0328112 A1 | 11/2018 | Berry et al. |
| 2018/0334825 A1 | 11/2018 | Miller et al. |
| 2019/0017334 A1 | 1/2019 | Loeyning et al. |
| 2019/0063649 A1 | 2/2019 | Snyder, II |
| 2019/0143532 A1 | 5/2019 | Cutkosky et al. |
| 2019/0145197 A1 | 5/2019 | Callaghan |
| 2019/0309585 A1 | 10/2019 | Miller et al. |
| 2019/0352982 A1 | 11/2019 | Arefi et al. |
| 2020/0032597 A1 | 1/2020 | Jorgic et al. |
| 2020/0040673 A1 | 2/2020 | Donnally et al. |
| 2020/0040674 A1 | 2/2020 | Mckenzie et al. |
| 2020/0061848 A1 | 2/2020 | Bolton et al. |
| 2020/0131860 A1 | 4/2020 | Lembcke et al. |
| 2020/0208775 A1 | 7/2020 | Eitland et al. |

(56) References Cited

U.S. PATENT DOCUMENTS

| | | | |
|---|---|---|---|
| 2021/0246738 A1 | 8/2021 | Mckenzie et al. |
| 2021/0293099 A1 | 9/2021 | Carnegie et al. |
| 2021/0301602 A1 | 9/2021 | Mckenzie et al. |
| 2022/0145704 A1 | 5/2022 | McKenzie |
| 2023/0003090 A1 | 1/2023 | Saunders et al. |
| 2023/0073941 A1 | 3/2023 | De Mul et al. |

FOREIGN PATENT DOCUMENTS

| | | | |
|---|---|---|---|
| CN | 108266139 A | 7/2018 |
| CN | 110792399 A | 2/2020 |
| EP | 1510302 A1 | 3/2005 |
| EP | 1953334 A2 | 8/2008 |
| EP | 4112870 | 2/2024 |
| GB | 2091788 A | 8/1982 |
| GB | 2532267 A | 5/2016 |
| JP | H09137689 A | 5/1997 |
| NO | 20151648 A1 | 12/2015 |
| WO | WO-8800274 A2 | 1/1988 |
| WO | 9525216 | 9/1995 |
| WO | WO-9958811 A1 | 11/1999 |
| WO | WO-0123701 A1 | 4/2001 |
| WO | WO-2004018829 A1 | 3/2004 |
| WO | WO-2007143842 A1 | 12/2007 |
| WO | WO-2013082172 A1 | 6/2013 |
| WO | WO-2014179730 A1 | 11/2014 |
| WO | WO-2015043740 A1 | 4/2015 |
| WO | WO-2016024859 A1 | 2/2016 |
| WO | WO-2016197255 A1 | 12/2016 |
| WO | WO-2017039996 A1 | 3/2017 |
| WO | WO-2017087595 A1 | 5/2017 |
| WO | WO-2017190120 A1 | 11/2017 |
| WO | WO-2017193204 A1 | 11/2017 |
| WO | WO-2019195651 A1 | 10/2019 |
| WO | WO-2020028852 A1 | 2/2020 |
| WO | WO-2020028853 A1 | 2/2020 |
| WO | WO-2020028853 A9 | 2/2020 |
| WO | WO-2020028856 A1 | 2/2020 |
| WO | WO-2020028858 A1 | 2/2020 |
| WO | WO-2020151386 A1 | 7/2020 |
| WO | WO-2020160440 A1 | 8/2020 |
| WO | WO-2020172407 A1 | 8/2020 |
| WO | WO-2021203122 A1 | 10/2021 |
| WO | WO-2021226622 A1 | 11/2021 |
| WO | WO-2022016168 A1 | 1/2022 |
| WO | 2024049478 | 3/2024 |

OTHER PUBLICATIONS

"U.S. Appl. No. 17/305,299, Advisory Action mailed Feb. 8, 2023", 5 pgs.
"U.S. Appl. No. 17/305,299, Response filed Mar. 7, 2023 to Advisory Action mailed Feb. 8, 2023", 9 pgs.
"U.S. Appl. No. 17/305,299, Non Final Office Action mailed Apr. 17, 2023", 8 pgs.
"Saudi Arabian Application Serial No. 522441146, Substantive Examination Report mailed Mar. 29, 2023", w English Translation, 9 pgs.
"U.S. Appl. No. 16/098,160, Advisory Action mailed Jul. 22, 2020", 5 pgs.
"U.S. Appl. No. 16/098,160, Advisory Action mailed Aug. 10, 2021", 4 pgs.
"U.S. Appl. No. 16/098,160, Corrected Notice of Allowability mailed Mar. 25, 2022", 4 pgs.
"U.S. Appl. No. 16/098,160, Examiner Interview Summary mailed Jun. 23, 2020", 3 pgs.
"U.S. Appl. No. 16/098,160, Final Office Action mailed Apr. 30, 2020", 7 pgs.
"U.S. Appl. No. 16/098,160, Final Office Action mailed May 27, 2021", 8 pgs.
"U.S. Appl. No. 16/098,160, Non Final Office Action mailed Sep. 15, 2021", 8 pgs.
"U.S. Appl. No. 16/098,160, Non Final Office Action mailed Sep. 30, 2019", 8 pgs.
"U.S. Appl. No. 16/098,160, Non Final Office Action mailed Oct. 6, 2020", 8 pgs.
"U.S. Appl. No. 16/098,160, Notice of Allowance mailed Feb. 3, 2022", 7 pgs.
"U.S. Appl. No. 16/098,160, Preliminary Amendment filed Nov. 1, 2018", 5 pgs.
"U.S. Appl. No. 16/098,160, Response filed Jan. 6, 2021 to Non Final Office Action mailed Oct. 6, 2020", 7 pgs.
"U.S. Appl. No. 16/098,160, Response filed Jan. 30, 2020 to Non Final Office Action mailed Sep. 30, 2019", 8 pgs.
"U.S. Appl. No. 16/098,160, Response filed Jun. 30, 2020 to Final Office Action mailed Apr. 30, 2020", 8 pgs.
"U.S. Appl. No. 16/098,160, Response filed Jul. 27, 2021 to Final Office Action mailed May 27, 2021", 9 pgs.
"U.S. Appl. No. 16/098,160, Response filed Aug. 24, 2020 to Advisory Action mailed Jul. 22, 2020", 9 pgs.
"U.S. Appl. No. 16/098,160, Response filed Aug. 27, 2021 to Advisory Action mailed Aug. 10, 2021", 8 pgs.
"U.S. Appl. No. 16/098,160, Response filed Dec. 14, 2021 to Non Final Office Action mailed Sep. 15, 2021", 8 pgs.
"U.S. Appl. No. 16/375,927, Advisory Action mailed Aug. 11, 2020", 6 pgs.
"U.S. Appl. No. 16/375,927, Corrected Notice of Allowability mailed Jan. 26, 2021", 2 pgs.
"U.S. Appl. No. 16/375,927, Examiner Interview Summary mailed Apr. 24, 2020", 3 pgs.
"U.S. Appl. No. 16/375,927, Examiner Interview Summary mailed Dec. 7, 2020", 7 pgs.
"U.S. Appl. No. 16/375,927, Final Office Action mailed Jun. 5, 2020", 10 pgs.
"U.S. Appl. No. 16/375,927, Non Final Office Action mailed Feb. 28, 2020", 9 pgs.
"U.S. Appl. No. 16/375,927, Non Final Office Action mailed Sep. 24, 2020", 10 pgs.
"U.S. Appl. No. 16/375,927, Notice of Allowance mailed Jan. 1, 2021", 8 pgs.
"U.S. Appl. No. 16/375,927, Response filed May 27, 2020 to Non Final Office Action mailed Feb. 28, 2020", 10 pgs.
"U.S. Appl. No. 16/375,927, Response filed Aug. 3, 2020 to Final Office Action mailed Jun. 5, 2020", 11 pgs.
"U.S. Appl. No. 16/375,927, Response filed Sep. 8, 2020 to Advisory Action mailed Aug. 11, 2020", 10 pgs.
"U.S. Appl. No. 16/375,927, Response filed Dec. 16, 2020 to Non Final Office Action mailed Sep. 24, 2020", 8 pgs.
"U.S. Appl. No. 16/431,533, Non Final Office Action mailed Feb. 14, 2022", 15 pgs.
"U.S. Appl. No. 16/431,540, Examiner Interview Summary mailed Jan. 19, 2021", 3 pgs.
"U.S. Appl. No. 16/431,540, Final Office Action mailed Nov. 19, 2020", 10 pgs.
"U.S. Appl. No. 16/431,540, Non Final Office Action mailed Jun. 10, 2020", 13 pgs.
"U.S. Appl. No. 16/431,540, Notice of Allowance mailed Feb. 11, 2021", 5 pgs.
"U.S. Appl. No. 16/431,540, Response filed Jan. 19, 2021 to Final Office Action mailed Nov. 19, 2020", 11 pgs.
"U.S. Appl. No. 16/431,540, Response filed Sep. 10, 2020 to Non Final Office Action mailed Jun. 10, 2020", 24 pgs.
"U.S. Appl. No. 16/431,540, Supplemental Notice of Allowability mailed Mar. 11, 2021", 2 pgs.
"U.S. Appl. No. 16/786,345, Non Final Office Action mailed Mar. 28, 2022", 13 pgs.
"U.S. Appl. No. 16/836,365, Final Office Action mailed May 4, 2021", 7 pgs.
"U.S. Appl. No. 16/836,365, Non Final Office Action mailed Jan. 25, 2021", 8 pgs.
"U.S. Appl. No. 16/836,365, Notice of Allowance mailed Jul. 27, 2021", 7 pgs.
"U.S. Appl. No. 16/836,365, Notice of Allowance mailed Nov. 3, 2021", 7 pgs.

(56) References Cited

OTHER PUBLICATIONS

"U.S. Appl. No. 16/836,365, Response filed Apr. 22, 2021 to Non Final Office Action mailed Jan. 25, 2021", 8 pgs.
"U.S. Appl. No. 16/836,365, Response filed Jul. 2, 2021 to Final Office Action mailed May 4, 2021", 7 pgs.
"U.S. Appl. No. 17/248,669, 312 Amendment filed Mar. 2, 2022", 3 pgs.
"U.S. Appl. No. 17/248,669, Examiner Interview Summary mailed Dec. 17, 2021", 2 pgs.
"U.S. Appl. No. 17/248,669, Non Final Office Action mailed Oct. 5, 2021", 8 pgs.
"U.S. Appl. No. 17/248,669, Notice of Allowability mailed Feb. 3, 2022", 5 pgs.
"U.S. Appl. No. 17/248,669, Notice of Allowance mailed Jan. 25, 2022", 8 pgs.
"U.S. Appl. No. 17/248,669, PTO Response to Rule 312 Communication mailed Mar. 9, 2022", 2 pgs.
"U.S. Appl. No. 17/248,669, Response filed Jan. 5, 2022 to Non Final Office Action mailed Oct. 5, 2021", 8 pgs.
"U.S. Appl. No. 17/305,299, Non Final Office Action mailed Aug. 18, 2022".
"Canadian Application Serial No. 3,022,888, Voluntary Amendment filed Jul. 12, 2019", 10 pgs.
"International Application Serial No. PCT/CA2017/000125, International Preliminary Report on Patentability mailed Nov. 22, 2018", 6 pgs.
"International Application Serial No. PCT/CA2017/000125, International Search Report mailed Aug. 14, 2017", 3 pgs.
"International Application Serial No. PCT/CA2017/000125, Written Opinion mailed Aug. 14, 2017", 4 pgs.
"International Application Serial No. PCT/CN2019/124443, International Preliminary Report on Patentability mailed May 26, 2021", 4 pgs.
"International Application Serial No. PCT/CN2019/124443, International Search Report mailed Mar. 5, 2020", 4 pgs.
"International Application Serial No. PCT/CN2019/124443, Written Opinion mailed Mar. 5, 2020", 4 pgs.
"International Application Serial No. PCT/US2019/025942, International Preliminary Report on Patentability mailed Oct. 30, 2020", 7 pgs.
"International Application Serial No. PCT/US2019/025942, International Search Report mailed Jun. 27, 2019", 4 pgs.
"International Application Serial No. PCT/US2019/025942, Response filed Feb. 5, 2020 to Written Opinion mailed Feb. 27, 2019", 14 pgs.
"International Application Serial No. PCT/US2019/025942, Response filed Apr. 23, 2020 to Written Opinion mailed Apr. 23, 2020", 14 pgs.
"International Application Serial No. PCT/US2019/025942, Response filed Sep. 22, 2020 to Written Opinion mailed Jul. 23, 2020", 4 pgs.
"International Application Serial No. PCT/US2019/025942, Written Opinion mailed Feb. 24, 2020", 8 pgs.
"International Application Serial No. PCT/US2019/025942, Written Opinion mailed Jun. 27, 2019", 9 pgs.
"International Application Serial No. PCT/US2019/025942, Written Opinion mailed Jul. 23, 2020", 5 pgs.
"International Application Serial No. PCT/US2019/044974, International Preliminary Report on Patentability mailed Nov. 11, 2020", 7 pgs.
"International Application Serial No. PCT/US2019/044974, International Search Report mailed Oct. 24, 2019", 6 pgs.
"International Application Serial No. PCT/US2019/044974, Response filed Jun. 2, 2020 to Written Opinion mailed Oct. 24, 2019", 13 pgs.
"International Application Serial No. PCT/US2019/044974, Response filed Aug. 18, 2020 to Written Opinion mailed Jun. 19, 2020", 4 pgs.
"International Application Serial No. PCT/US2019/044974, Written Opinion mailed Jun. 19, 2020", 7 pgs.
"International Application Serial No. PCT/US2019/044974, Written Opinion mailed Oct. 24, 2019", 6 pgs.
"International Application Serial No. PCT/US2019/044976, International Preliminary Report on Patentability mailed Mar. 9, 2021", 7 pgs.
"International Application Serial No. PCT/US2019/044976, International Search Report mailed Oct. 18, 2019", 5 pgs.
"International Application Serial No. PCT/US2019/044976, Response filed Jun. 3, 2020 to Written Opinion mailed Oct. 18, 2019", 11 pgs.
"International Application Serial No. PCT/US2019/044976, Response filed Aug. 25, 2020 to Written Opinion mailed Jun. 26, 2020", 3 pgs.
"International Application Serial No. PCT/US2019/044976, Written Opinion mailed Jun. 6, 2020", 4 pgs.
"International Application Serial No. PCT/US2019/044976, Written Opinion mailed Oct. 18, 2019", 8 pgs.
"International Application Serial No. PCT/US2019/044976, Written Opinion mailed Nov. 6, 2020", 6 pgs.
"International Application Serial No. PCT/US2019/044979, International Preliminary Report on Patentability mailed Nov. 18, 2020", 7 pgs.
"International Application Serial No. PCT/US2019/044979, International Search Report mailed Oct. 22, 2019", 6 pgs.
"International Application Serial No. PCT/US2019/044979, Response filed Jun. 3, 2020 to Written Opinion mailed Oct. 22, 2019", 12 pgs.
"International Application Serial No. PCT/US2019/044979, Response filed Aug. 25, 2020 to Written Opinion mailed Jun. 26, 2020", 3 pgs.
"International Application Serial No. PCT/US2019/044979, Written Opinion mailed Jun. 26, 2020", 4 pgs.
"International Application Serial No. PCT/US2019/044979, Written Opinion mailed Oct. 22, 2019", 7 pgs.
"International Application Serial No. PCT/US2019/044983, International Preliminary Report on Patentability mailed Feb. 18, 2021", 8 pgs.
"International Application Serial No. PCT/US2019/044983, International Search Report mailed Oct. 22, 2019", 5 pgs.
"International Application Serial No. PCT/US2019/044983, Written Opinion mailed Oct. 22, 2019", 6 pgs.
"International Application Serial No. PCT/US2019/124443, Response filed Nov. 24, 2020 to Written Opinion mailed Mar. 5, 2020", 10 pgs.
"International Application Serial No. PCT/US2020/019039, International Preliminary Report on Patentability mailed Sep. 2, 2021", 6 pgs.
"International Application Serial No. PCT/US2020/019039, International Search Report mailed May 15, 2020", 2 pgs.
"International Application Serial No. PCT/US2020/019039, Written Opinion mailed May 15, 2020", 4 pgs.
"International Application Serial No. PCT/US2021/070319, International Search Report mailed May 31, 2021", 5 pgs.
"International Application Serial No. PCT/US2021/070319, Written Opinion mailed May 31, 2021", 6 pgs.
"International Application Serial No. PCT/US2021/070488, International Preliminary Report on Patentability mailed Jun. 1, 2022", 5 pgs.
"International Application Serial No. PCT/US2021/070488, International Search Report mailed Sep. 8, 2021", 4 pgs.
"International Application Serial No. PCT/US2021/070488, Invitation to Pay Additional Fees mailed Jun. 28, 2021", 2 pgs.
"International Application Serial No. PCT/US2021/070488, Written Opinion mailed Sep. 8, 2021", 6 pgs.
"International Application Serial No. PCT/US2021/070786, International Search Report mailed Nov. 9, 2021", 4 pgs.
"International Application Serial No. PCT/US2021/070786, Invitation to Pay Additional Fees mailed Sep. 1, 2021", 2 pgs.
"International Application Serial No. PCT/US2021/070786, Written Opinion mailed Nov. 9, 2021", 7 pgs.
"International Application Serial No. PCT/US2022/070377, International Search Report mailed Mar. 25, 2022", 5 pgs.
"International Application Serial No. PCT/US2022/070377, Written Opinion mailed Mar. 25, 2022", 7 pgs.
"Moveit—Kinematic constraints: Visibility Constraint Class Reference", [online]. [retrieved Apr. 21, 2021]. Retrieved from the Internet: <URL: http://docs.ros.org/en/hydro/api/moveit_core/html/classkinematic_constraints_1_1VisibilityConstraint.html>, (2021), 8 pgs.

(56) References Cited

OTHER PUBLICATIONS

"Moveit—Moving robots into the future", [online]. [archived Dec. 4, 2020]. Retrieved from the Internet: <URL: https://web.archive.org/web/20201204224545/https://moveit.ros.org/>, (2020), 7 pgs.

"Saudia Arabian Application No. 521421161, Office Action mailed Mar. 31, 2022", (w/ English Summary), 6 pgs.

"European Application Serial No. 22182437.8, Extended European Search Report mailed Nov. 7, 2022", 7 pgs.

"U.S. Appl. No. 17/305,299, Response filed Nov. 18, 2022 to Non Final Office Action mailed Aug. 18, 2022", 10 pgs.

"U.S. Appl. No. 17/305,299, Final Office Action mailed Dec. 9, 2022", 12 pgs.

"International Application Serial No. PCT US2022 075797, International Search Report mailed Jan. 3, 2023", 2 pgs.

"International Application Serial No. PCT US2022 075797, Written Opinion mailed Jan. 3, 2023", 4 pgs.

"U.S. Appl. No. 17/305,299, Response filed Jul. 12, 2023 to Non Final Office Action mailed Apr. 17, 2023", 8 pgs.

"European Application Serial No. 22182437.8, Response filed Jul. 19, 2023 to Extended European Search Report mailed Nov. 7, 2022", 24 pgs.

"U.S. Appl. No. 17/305,299, Notice of Allowance mailed Aug. 11, 2023", 5 pgs.

"U.S. Appl. No. 17/305,299, Supplemental Notice of Allowability mailed Aug. 23, 2023", 2 pgs.

"Saudi Arabian Application Serial No. 122431308, Substantive Examination Report mailed Aug. 15, 2023", w English translation, 11 pgs.

"European Application Serial No. 21800853.0, Extended European Search Report mailed Feb. 7, 2024", 9 pgs.

"Saudi Arabian Application Serial No. 122431308, Response filed Nov. 8, 2023 to Substantive Examination Report mailed Aug. 15, 2023", w English claims, 27 pgs.

"Saudi Arabian Application Serial No. 522441146, Subsequent Examiners Report mailed Apr. 29, 2024", W English Translation, 9 pgs.

"Saudi Arabian Application Serial No. 522441146, Response filed Jul. 24, 2023 to Substantive Examination Report mailed Mar. 29, 2023", w English claims, 34 pgs.

\* cited by examiner

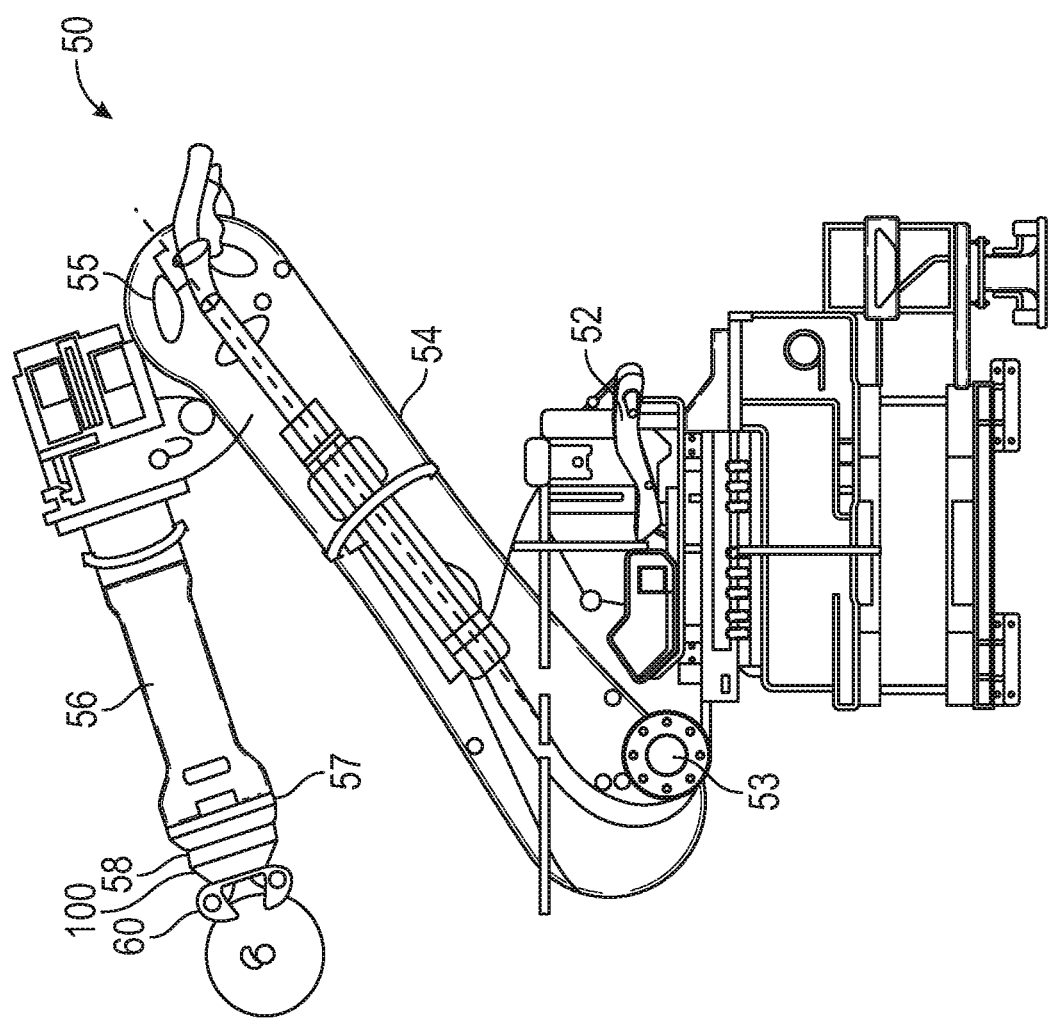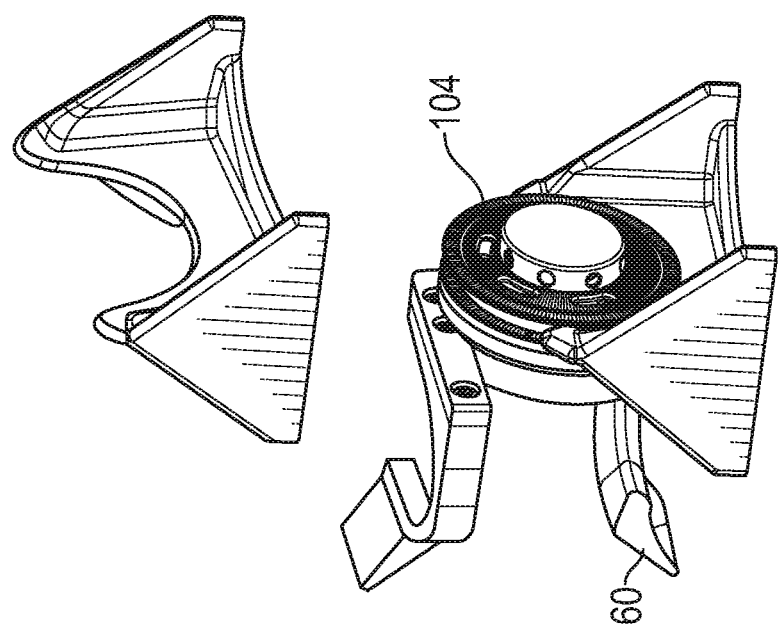
FIG. 1

PASSIVE ROTATION DISCONNECT

CLAIM OF PRIORITY

This patent application is a U.S. National Stage Filing under 35 U.S.C. 371 from International Application No. PCT/US2021/070488, filed on Apr. 30, 2021, which claims the benefit of U.S. Provisional Patent Application No. 63/019,366, filed May 3, 2020, each of which are incorporated by reference herein in their entirety.

FIELD OF THE INVENTION

The present disclosure relates to tool connections. In particular, the present disclosure relates to automated tool exchange devices and systems. More particularly, the present disclosure relates to a passive connection and disconnection system for attaching tools to a tool arm.

BACKGROUND OF THE INVENTION

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

Many pipe handling operations, such as drill pipe handling operations, are conventionally performed with workers performing manual operations. For example, drilling of wells involves tripping of the drill string, during which drill pipes are lowered into (tripping in) or pulled out of (tripping out) a well. Tripping may typically occur in order to change all or a portion of the bottom hole assembly, such as to change a drill bit. Where drill pipe is tripped into a well, stands or lengths of drill pipe may be supplied from a storage position in a setback area of the drill rig and connected end-to-end to lengthen the drill string in the well. Where drill pipe is tripped out of a well, stands or lengths of drill pipe may be disconnected from the drill string and may be positioned in the setback area.

As with other pipe handling operations, tripping has conventionally been performed with human operators. In particular, while an elevator or top drive may be used to carry the load of a stand of drill pipe during trip in and trip out operations, human operators may typically maneuver the drill pipe stands around the drill floor, such as between the well center and the setback area. For example, a first human operator may be positioned on the drill floor, at or near the well, to maneuver a lower end of drill pipe stands as they are tripped into or out of the well, while a second human operator may be positioned on or above the racking board to maneuver an upper end of drill pipe stands as the stands are moved between the well and the setback area. Operators often use ropes and/or other tools to maneuver the drill pipe stands on or above the drill floor. Such work is labor-intensive and can be dangerous. Moreover, trip in and trip out operations may be limited by the speed at which the human operators can maneuver the stands between well center and the setback area.

Robotic pipe handling systems may be used to handle pipe to assist with and/or perform the above pipe handling operations on a drill rig. The robots may include a series of links that are hingedly and/or pivotally connected to one another and reach to an end effector. While helpful to have a robot to assist with pipe handling, the end effector may be adapted for a particular purpose or use and may limit the versatility of the robot. Moreover, electrical, hydraulic, or other power may not be desirable to aid in engaging/disengaging particular end effectors or tools. That is, while a robot may have power for moving the robot, particular actuation power for coupling and decoupling tools may not be present or desirable in the robotic environment or in other environments.

BRIEF SUMMARY OF THE INVENTION

The following presents a simplified summary of one or more embodiments of the present disclosure in order to provide a basic understanding of such embodiments. This summary is not an extensive overview of all contemplated embodiments and is intended to neither identify key or critical elements of all embodiments, nor delineate the scope of any or all embodiments.

In one or more embodiment, a coupling mechanism for securing a tool to a tool arm may include a housing. The mechanism may also include an engaging lock arranged within the housing and configured for rotation by the tool arm. Rotation of the engaging lock may drive locking mechanisms partially through the housing to establish a longitudinally secured connection.

In one or more embodiments, a method of interchanging an end effector may include engaging a tool portion of a coupling mechanism with a proximal portion. The tool portion may be arranged in a fixture and held against rotation and horizontal translation. The method may include rotating the proximal portion to activate an engaging lock and lifting the tool portion from the fixture. The method may also include engaging a relative rotation lock by the lifting.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying Figures, in which:

FIG. 1 is a perspective view of a robot with a coupling mechanism, according to one or more embodiments.

DETAILED DESCRIPTION

Figure 2:
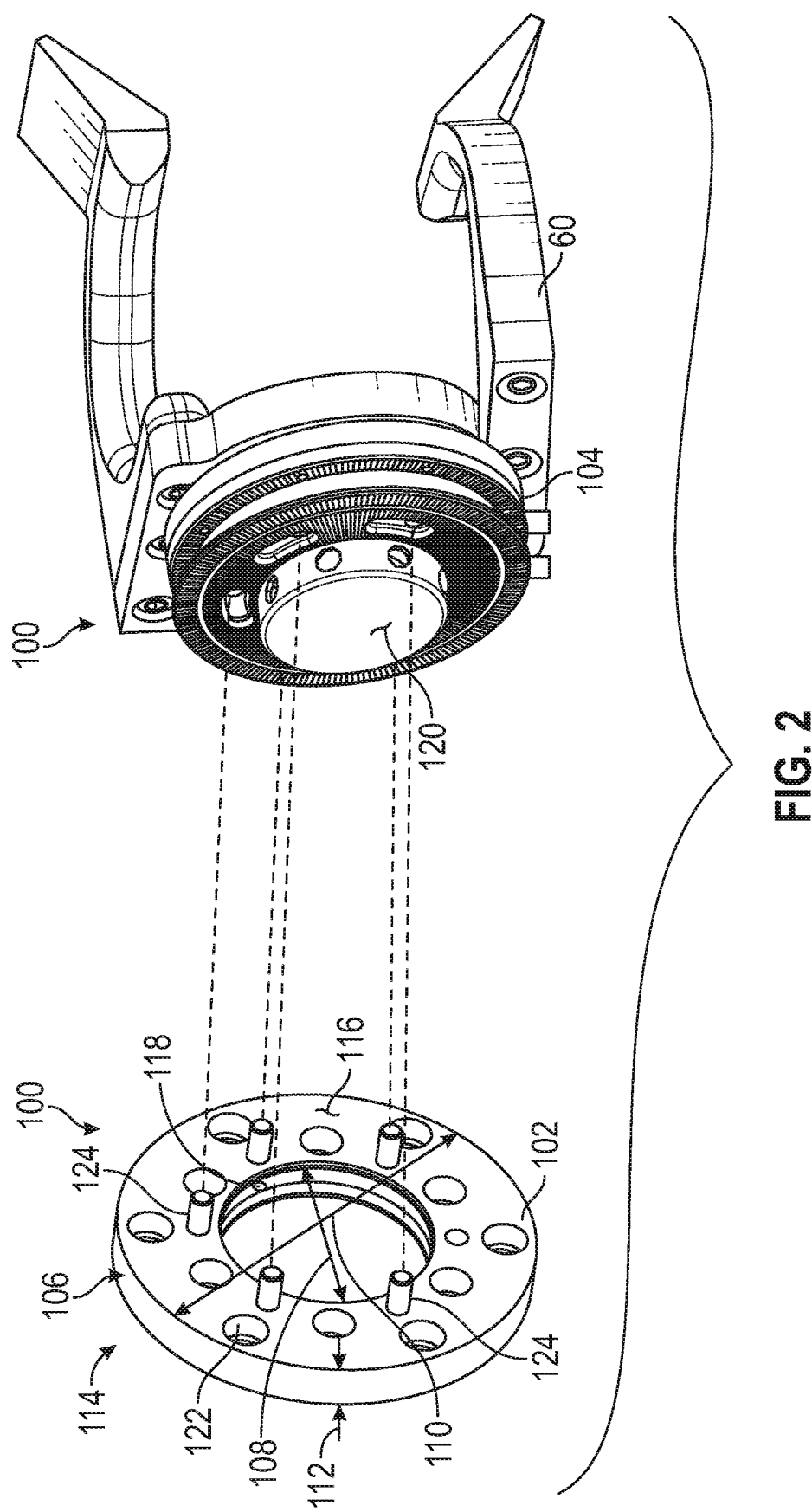
FIG. 2 is an exploded view of the coupling mechanism of FIG. 1.

The present disclosure, in one or more embodiments, relates to devices, systems, and methods for passively connecting/disconnecting a tool to/from a tool arm. In particular, a coupling mechanism may be provided that allows for interchanging end effectors or other tools without the use of hydraulic, pressurized air, electrical, or other type of power to engage/disengage a coupling mechanism. Rather rotation of one portion of the coupling mechanism relative to another portion may be sufficient to engage the two parts of the coupling mechanism. In one or more embodiments, the passive coupling mechanism may be coupled and decoupled by engaging an end effector or other tool positioned in a fixture with a portion of the coupling mechanism and rotating that portion of the coupling mechanism. This may occur by rotating a tool arm, for example, or rotating a wrist portion of a robot. In the case of tubular handling, the end effector may be lifted from the fixture and used to handle tubulars on a drill rig, for example. To replace the end effector in the fixture, the robot or user may cause the end effector to engage the fixture and rotation may, again, be used to uncouple the end effector from control by the tool arm or robot allowing for the end effector to be left behind in the fixture for later use. The coupling mechanism may, thus, provide for a secured connection of an end effector to a tool arm or robot that allows for interchangeability of end effectors or other tools without reliance on power to actuate the coupling mechanism, for example.

Referring now to FIG. 1, a robot is shown in use and near a pair of fixtures. The fixtures may define a setting or holding location for end effectors or other robot tools. As shown, one of the fixtures is empty and the other fixture is holding an end effector. Another end effector is arranged on the robot. The present application may provide a mechanism for placing the end effector on the robot on an empty fixture, releasing the end effector, and engaging and coupling to another available end effector. As such, the versatility of the robot may be increased.

With continued reference to FIG. 1, a pipe handling robot 50 of the present disclosure is shown, according to one or more embodiments. The pipe handling robot 50 may be configured to manipulate tubulars such as lengths of pipe including, drilling pipe or drill collar. In some embodiments, the pipe handling robot 50 may be configured for manipulating stands of drill pipe, each stand comprising one, two, three, four, five, or any other suitable number of pipe lengths or sections. The robot 50 may be manually operable and/or may be programmable. That is, while the operative portion of the system may be described as being a robot 50, the coupling mechanism described herein may be used in other contexts as well where a tool is being attached to an arm, for example. That is, nothing in this disclosure shall limit the use of the coupling mechanism to a robot environment. The coupling mechanism may, for example, be applicable to hand tools and other systems where tools may be interchanged. For example, socket sets, air compressor tools, or other interchangeable tool environments. Where a robot is provided, in some embodiments, the robot 50 may be programmable with a finite state machine or other programming configured to perform a sequence of operations. As shown in FIG. 1, the robot 50 may include a base portion 52, a shoulder portion 54, an articulated arm 56, a wrist portion 58, and an end effector 60. The end effector may be coupled to the wrist portion with a coupling mechanism 100.

The base portion 52 may be configured to couple or fix the robot 100 to a surface, from which the robot may extend to perform operations. In some embodiments, the base portion 52 may provide a means of moving the robot 50 with respect to the surface from which it extends or is otherwise arranged or affixed. For example, the base portion 52 may have skids or rollers configured for sliding engagement with a track or rail. In other embodiments, the base portion 52 may have other movement means for moving the robot 50, such as wheels, treads, a walking mechanism, or other suitable movement means. In one or more embodiments, the base portion may be secured to a drill floor of a drill rig or it may be secured to framing at or near a racking board, for example.

The shoulder portion 54 may couple, at a proximal end of the shoulder portion, to the base portion 52. The shoulder portion 54 may couple to the base portion 52 via a joint 53, which may be or include a swivel joint in some embodiments. The swivel joint 53 may allow the shoulder portion 54 to twist or rotate about a central axis with respect to the base portion 52. In other embodiments, the shoulder portion 54 may couple to the base portion 52 with a different joint, or the shoulder may couple to the base portion without a joint. The shoulder portion 54 may extend from the base portion 52 at an angle, such that a longitudinal axis of the shoulder portion may be offset from a longitudinal axis of the base portion by approximately 10-45 degrees, or any other suitable degree of offset. The shoulder portion 54 may have a length ranging from approximately 12 inches to approximately 100 inches.

The articulated arm 56 may couple to the shoulder portion 54 at a distal end of the shoulder portion and a proximal end of the articulated arm. A joint or elbow 55, which may be or include a pitch joint, may be arranged between the articulated arm 56 and shoulder portion 54. The pitch joint 55 may allow the articulated arm 56 to pivot with respect to the shoulder portion 54 about an axis extending lateral to the shoulder portion and articulated arm. In some embodiments, the pitch joint 55 may allow the articulated arm 56 to pivot within a range of up to 360 degrees of rotation. In other embodiments, the articulated arm 56 may couple to the shoulder portion 54 via a different joint or without a jointed connection. The articulated arm 56 may have a length of between approximately 20 inches and approximately 100 inches.

The wrist 58 may couple to the articulated arm 56 at a distal end of the articulated arm and a proximal end of the wrist. A joint 57 may be arranged between the wrist portion 58 and the articulated arm 56 and may provide for pivotable or rotational movement of the wrist with respect to the articulated arm about one or more axes. The joint 57 may be or include a pitch joint allowing for pivotable movement about a first lateral axis extending lateral to the articulated arm 56 and wrist 58, a yaw joint allowing for pivotable movement about a second lateral axis perpendicular to the first lateral axis, and/or a roll joint allowing for pivotable or rotational movement about an axis extending longitudinally through the wrist portion. The wrist portion 58 may have pivotable or rotational movement about each axis within a range of up to 360 degrees of rotation. In other embodiments, the wrist portion 58 may couple to the articulated arm 56 via a different joint or without a jointed connection. The wrist 58 may be configured to provide a mechanical interface or mounting point for coupling an end effector 60 to the robot 50. In some embodiments, still another joint, such as a pitch, yaw, and/or roll joint, may allow for pivotable movement of the end effector 60 with respect to the wrist portion 58. In some embodiments, the robot may have a mechanism, which may be a self-contained actuator mechanism that is electrically or hydraulically actuated, for example, configured to rotate or pivot the end effector. The actuator mechanism may be independent from axis controls for the articulated arm and/or other arm movement controls.

The end effector 60 may extend from a distal end of the wrist portion 58 and may be configured to provide an operational or tooling hand for various operations performed by the robot 50. While not discussed in detail herein, end effectors or robot tools may be provided in a variety of forms. For example, end effectors or robot tools may be provided as shown and described in International Patent Application No. PCT/US2019/044976 filed on Aug. 2, 2019 and entitled End Effectors for Automated Pipe Handling, the content of which is hereby incorporated by reference herein in its entirety. Still other non-robotic end effectors may be provided such as sockets, air tools, or other tools.

As mentioned, end effector interchangeability may be provided by a coupling mechanism 100. As shown in FIG. 2, the coupling mechanism 100 may include a robot or proximal portion 102 and a tool portion 104. The proximal portion 102 may be affixed to the wrist 58 of the robot 50, for example, or it may be affixed to a tool arm air hose, or other operable element. The tool portion 104 may be arranged on an end effector or other tool 60 and may be adapted for selective engagement by the proximal portion 102. As mentioned, while the present coupling mechanism 100 is being described in the context of a robotic environment, still other uses may be provided. As such, by referring to one portion of the coupling mechanism 100 as a robot or proximal portion 102, the term or phrase controlled portion or arm portion is to be considered equally applicable. That is, the robot or proximal portion 102 should not be considered to necessarily implicate the presence of a robot. For this purpose, the robot or proximal portion will be referred to hereafter as proximal portion.

With continued reference to FIG. 2, the proximal portion 102 may be configured to selectively engage the tool portion 104 of the coupling mechanism 100. The proximal portion may include a body portion 106 adapted for attachment to the robot 50, tool arm, or other actuating or controlling device. The body portion 106 may include a plate or other shape adapted for placement against and attachment to the wrist 58 of the robot 50 or the plate of a tool arm, for example. In one or more embodiments, the body portion 106 may include an annularly shaped plate with an outer diameter 110, an inner diameter 108, and a thickness 112. The outer diameter 110 may be selected to be the same, slightly smaller, and/or slightly larger than the wrist 58 and the inner diameter 108 may be selected to receive a coupling plug of the tool portion 104. The thickness may be selected to receive the coupling plug 120 of the tool portion 104 and to allow for engagement with the coupling plug 120 on an inner surface thereof. The body portion may include a back face 114 adapted for securing against the wrist of the robot or tool arm and a front face 116 adapted for engaging the tool portion 104 of the coupling mechanism 100. The thickness 112 of the body portion 106 may define an outside wall and inside wall. The outside wall may be arranged along the outside diameter and may extend from the back face to the front face forming a substantially cylindrical outer surface. Similarly, the inside wall may be arranged along the inside diameter and may extend from the back face to the front face. The inside wall may include a groove 118 extending along the length of the inside wall. The groove 118 may be adapted to receive a ball from the coupling plug of the tool portion 104 to cause the proximal portion 102 and the tool portion 104 to lockingly engage.

In one or more embodiments, the body portion 106 may include a plurality of bores 122 extending through the body portion from the front face to the back face and adapted to receive fasteners to secure the body portion to the wrist of the robot or other operating device or element, for example. The body portion 106 may also include a plurality of protruding engagement features 124 extending from the front face 116 and adapted to engage with the tool portion 104 and trigger a locking mechanism. In one or more embodiments, the protruding engagement features 124 may include a plurality of dowels arranged along a circle having a diameter between the inner and outer diameters of the body portion 106. In one or more embodiments, the front face 116 may be a substantially flat face and the dowels may extend substantially perpendicular to the front face 116. The dowels may be spaced along the circle so as to engage openings in the tool portion 104. The dowels may be adapted to unlock the particular features of the tool portion to allow the tool portion to be coupled to the proximal portion 102 and to free the tool portion from its fixture.

Figure 3:
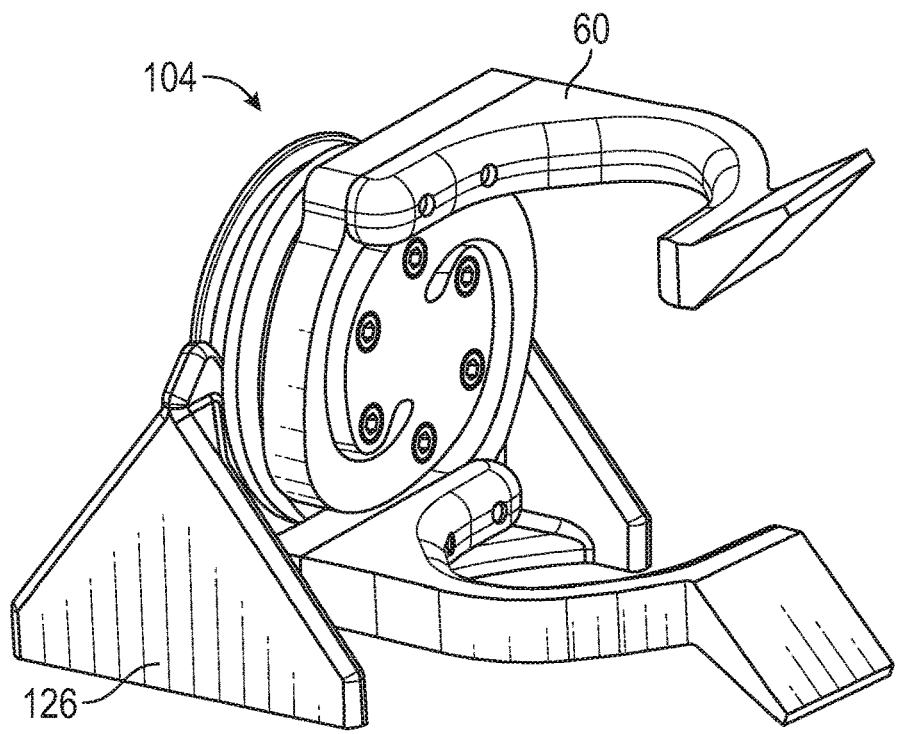
FIG. 3 is a back perspective view of a tool portion of a coupling mechanism with an end effector and arranged in a fixture, according to one or more embodiments.
Figure 4:
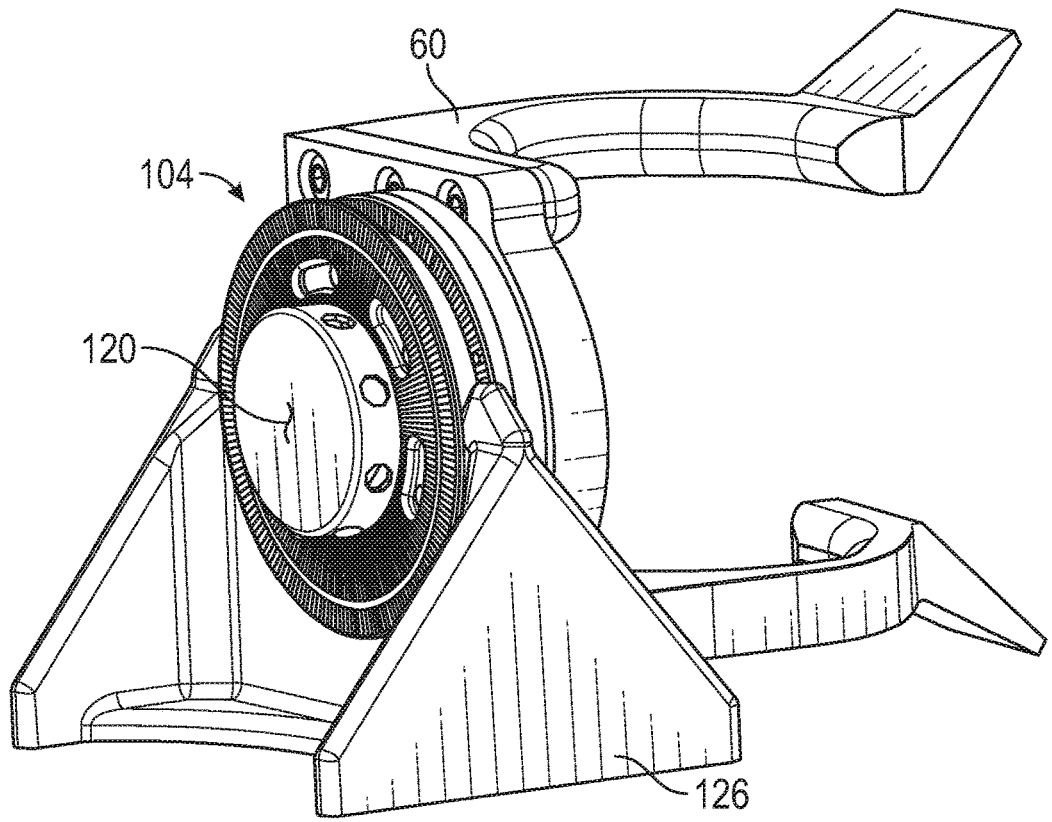
FIG. 4 is a front perspective view of a tool portion of a coupling mechanism with an end effector and arranged in a fixture, according to one or more embodiments.
Figure 5:
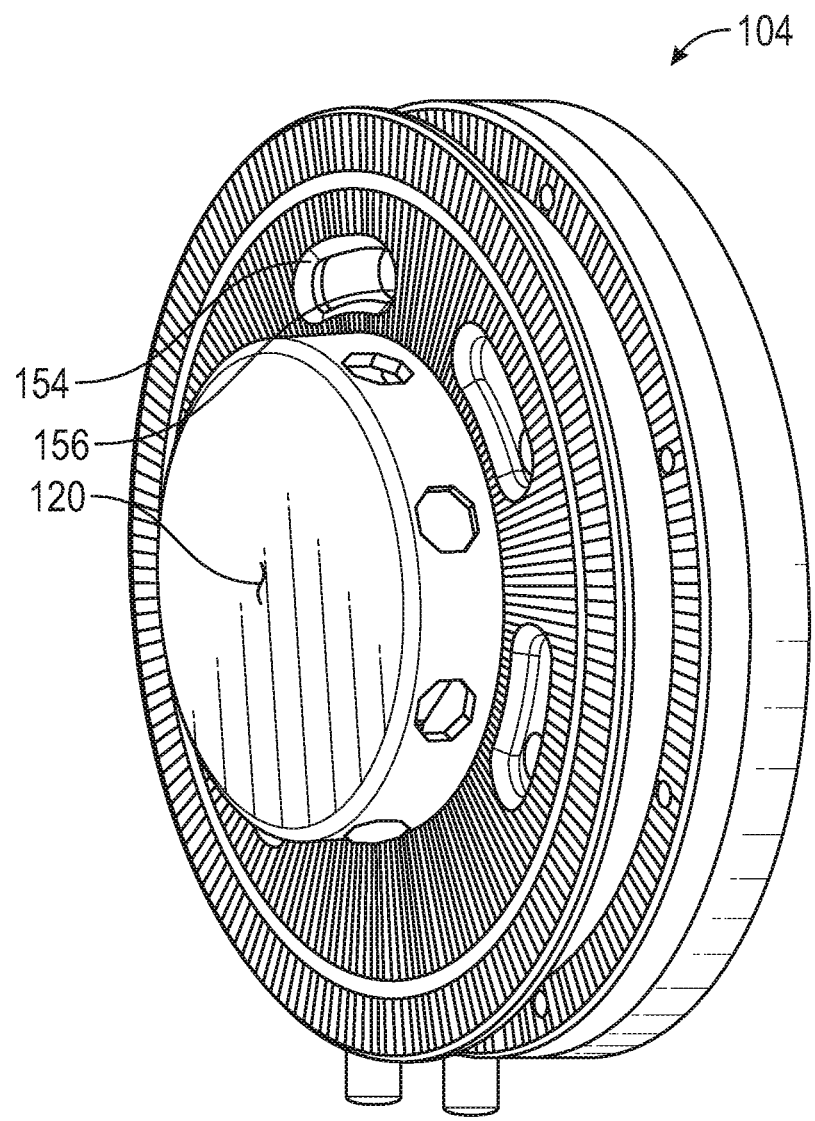
FIG. 5 is front perspective view of a tool portion of a coupling mechanism, according to one or more embodiments.
Figure 6:
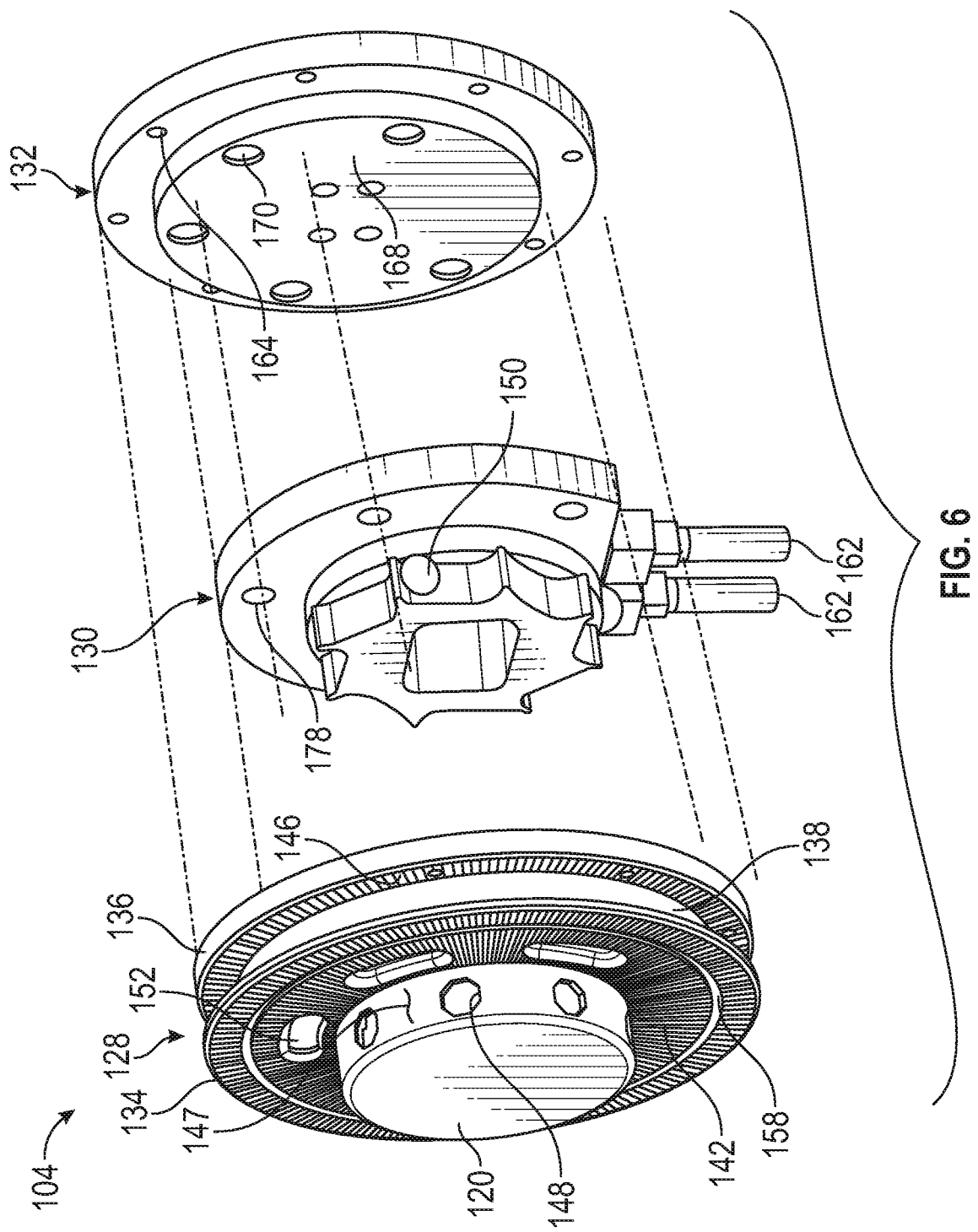
FIG. 6 is a front perspective exploded view thereof.
Figure 7:
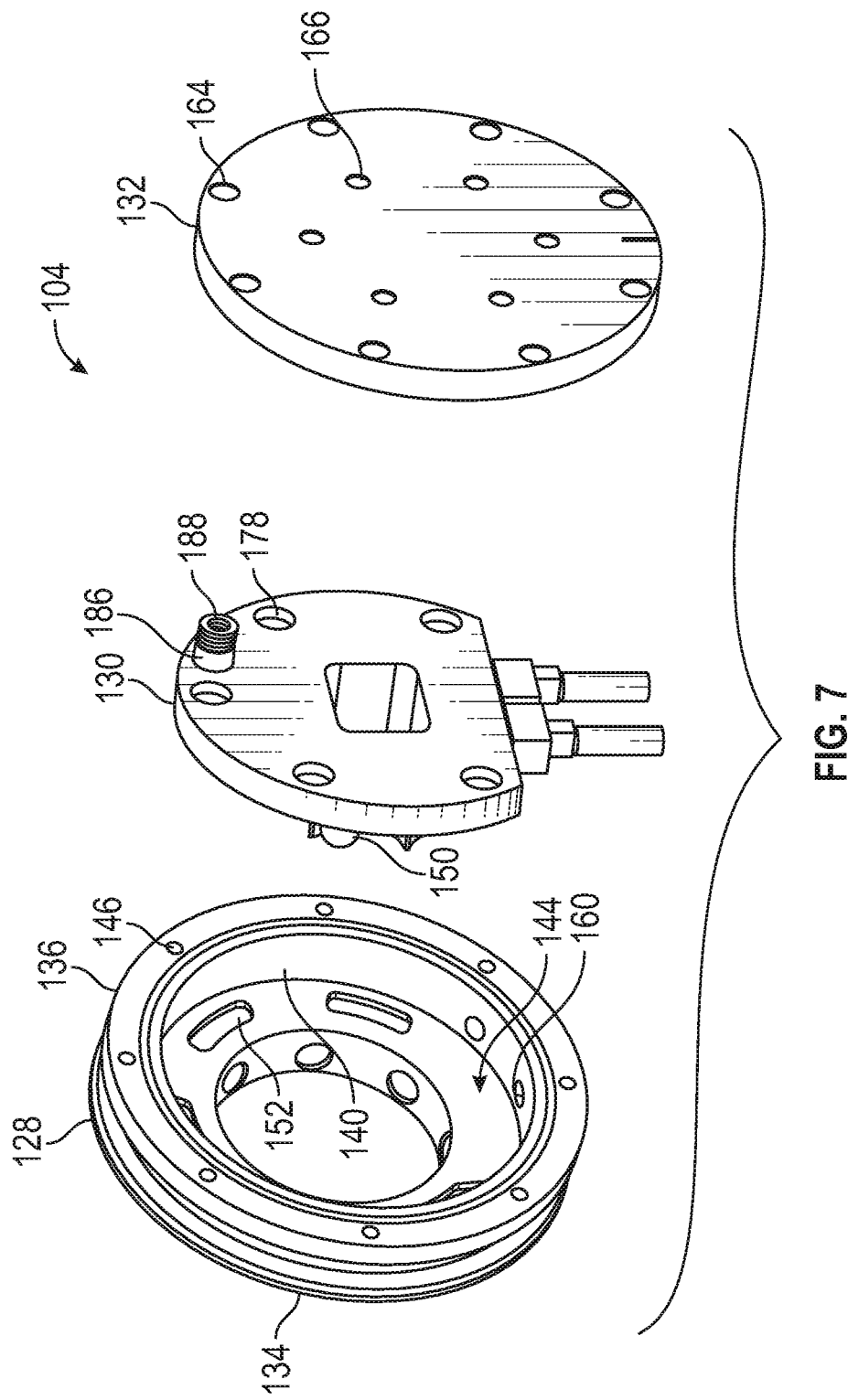
FIG. 7 is a back perspective exploded view thereof.

The tool portion 104 is shown in FIGS. 3 and 4 arranged in a fixture 126 and having an end effector 60 secured thereto. The tool portion 104 may be configured for resting in a fixture 126 as shown and for being resistant to rotation in the fixture 126. The tool portion 104 may be adapted for engagement by a robot or tool arm in the fixture 126 and lifting from the fixture by the robot or tool arm. The tool portion 104 may also be adapted to couple with the proximal portion in secure fashion to withstand the pushing and pulling forces generated from operations of the robot or other operating device. In one or more embodiments, the tool portion may be adapted to couple with the proximal portion to withstand forces generated from the end effector handling tubulars. FIG. 5 shows a perspective view of the tool portion 104 and FIGS. 6 and 7 show perspective exploded front and back views, respectively, of the tool portion 104. As shown, the tool portion 104 may include an interfacing housing 128, an engaging lock 130, an end effector interface 132, and one or more relative rotation lock systems may be provided.

The interfacing housing 128 is shown in FIGS. 6 and 7. The interfacing housing 128 may be adapted to engage with the proximal portion 102 of the coupling mechanism 100 as well as the fixture 126. As shown, the interfacing housing 128 may include a front engagement plate 134 and a back engagement plate 136. The front and back engagement plates 134/136 may be annularly shaped and spaced apart from one another defining a circumferential groove or slot 138 along an outer peripheral edge thereof. The groove or slot 138 may be adapted to receive the fixture 126 allowing the interfacing housing 128 to nestingly rest on the fixture 126. The front engagement plate 134 and the back engagement plate 136 may extend radially outward from a central cylindrical shell 140 to an outer peripheral edge. The central cylindrical shell 140 may define the bottom of the groove or slot 138 and may be sized and shaped to substantially match a radiused seat of the fixture 126. The front engagement plate 134 may also extend radially inward from the central cylindrical shell 140 defining a front surface 142 that is larger than a back surface of the back engagement plate. Together, the front engagement plate 134, the central cylindrical shell 140 and the back engagement plate 136 may define an internal cavity 144. As shown, the back engagement plate 136 may include a plurality of openings 146 each for receiving a fastener to connect the interfacing housing to the end effector interface 132. Each of the front engagement plate 134 and the back engagement plate 136 may have substantially smooth surfaces or a radiating line surface pattern may be provided as shown. Still other surface patterns may be provided or used.

The interfacing housing 128 may also include a hub or plug 120 extending longitudinally from an inner radial edge of the front engagement plate 134. The hub or plug 120 may be sized and shaped to engage the body portion 106 of the proximal portion 102 of the coupling mechanism 100. That is, the hub or plug 120 may have a diameter selected to be slightly smaller than the inner diameter of the annularly shaped body portion 106 of the proximal portion 102, for example. The hub or plug 120 may also extend from the front engagement plate 134 by a distance similar to the thickness or slightly less than the thickness 112 of the body portion 106 of the proximal portion 102. The hub or plug 120 may have a cylindrical sidewall 147 including a plurality of openings 148 spaced along the periphery of the hub or plug 120 and extending through the sidewall 146. The openings 148 may be sized and shaped to allow actuated catches 150 to extend partially therethrough so as to engage the groove 118 on the inside wall of the body portion 106 of the proximal portion 102 of the coupling mechanism 100. That is, for example, the openings 148 may have a diameter slightly smaller than an engagement ball such that the ball may extend partially through the opening 148 and seat in the groove 118 of the proximal portion 102, but the opening 148 may prevent full exit of the ball.

As shown, the interfacing housing 128 may include a plurality of circumferentially extending slots 152 extending through the front engagement plate 134. The slots 152 may be adapted to receive the dowels 124 from the proximal portion 102 and, as such, may be arranged on a diameter that is the same or similar to the diameter of the circle on which the dowels 124 of the proximal portion 102 are arranged. The diameter of the circle may be, for example, smaller than the diameter of the central cylindrical shell. The slots 152 may be kidney shaped, for example, so as to allow for rotation of the dowels 124 relative to the front engagement plate 134 after the dowels 124 are inserted into the slots 152. The dowels may be used to actuate the engaging lock 130 by insertion through the slots 152 and rotating relative to the front engagement plate 134. Referring to FIG. 5, in one or more embodiments, the kidney shaped slots may have an initial engagement end 154 and a locking end 156. That is, the dowels 124 from the proximal portion 102 may be inserted into the slots 152 at an initial engagement end 154 and then the dowels 124 may be rotated to a locking end 156 of the slots 152.

The front engagement plate 134 may also include a circumferentially extending groove 158 on a front surface thereof at a radial dimension beyond the slots 152. The groove 158 may be adapted for receiving a seal or O-ring, for example, to allow the interfacing housing 134 to seal against the front face 116 of the body 106 of the proximal portion 102.

As best shown in FIG. 7, the interfacing housing 134 may include one or more openings 160 extending through the central cylindrical shell 140. The openings 160 may be arranged in the groove 138 between the front and back engagement plates 134/136 and may be adapted to allow fixture dowels 162 to pass therethrough to rotationally secure the tool portion 104 to the fixture 126. In one or more embodiments, the openings 160 may be arranged through a bottom portion of the shell 140. In other embodiments, other positions may be used.

The end effector interface 132 may be arranged on an end of the tool portion 104 opposite the interfacing housing 128 and may provide a backing and attachment surface for the housing 128. The end effector interface 132 may include a substantially plate-like element having a circumferential bore circle near an outer peripheral edge. The bore circle may have a diameter that is the same or similar to the diameter of the openings 146 on the back engagement plate 136 of the interfacing housing 128 and a plurality of bores 164 may be spaced along the bore circle to align with the openings on the back engagement plate 136. The back of the end effector interface 132 may include a plurality of bores 166 for securing an end effector 60. The bores 166 may be threaded bores for bolting an end effector 60 thereto, for example.

The end effector interface 132 may also include a raised surface 168 on a front side thereof. The raised surface 168 may be circular and adapted to nest within the cavity 144 of the interfacing housing 128 while leaving room for the engaging lock 130. As shown, the raised surface 168 may include a plurality of bores 170 extending therethrough. The bores 170 may be arranged on a bore circle having a diameter that is the same or similar to the diameter of the circumferentially extending slots 152 on the front engagement plate 134. The plurality of bores 170 may be arranged along the bore circle and the bores may be spaced such that each bore may align with a portion of one of the kidney-shaped slots 152 of the front engagement plate 134. The bores 170 may function to hold a relative rotation lock adapted to prevent inadvertent rotation of the engaging lock 130 as described in more detail below.

Figure 8:
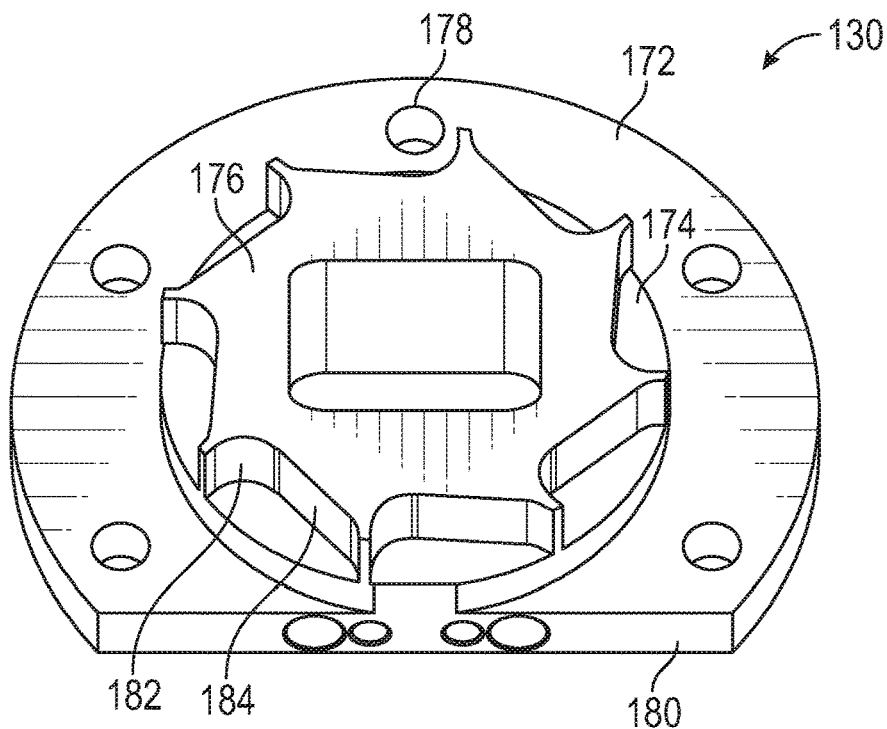
FIG. 8 is a perspective view of an engaging lock of the coupling mechanism, according to one or more embodiments.
Figure 9:
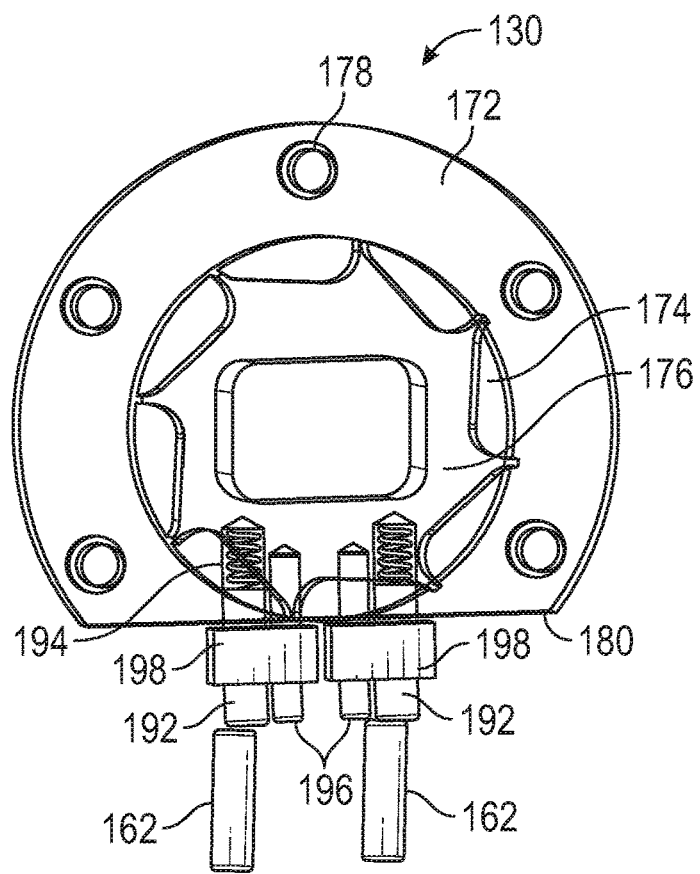
FIG. 9 is a front view of the engaging lock of FIG. 8.

The engaging lock 130 is also shown in FIGS. 6 and 7. As shown, the lock 130 is sized and adapted to fit within the cavity 144 of the interfacing housing 128 between the front engagement plate 134 thereof and the end effector interface 132. The engaging lock 130 may be configured for rotation within the cavity 144 to cause the tool portion 104 of the coupling mechanism 100 to lockingly engage the proximal portion 102. In particular, the engaging lock 130 may rotate to drive locking balls 150 outward through the openings 148 in the cylindrical sidewall of the hub 120 of the interfacing housing 128. The balls 150 may engage the groove 118 on the inside wall of the body 106 of the proximal portion 102 of the coupling mechanism 100 thereby preventing relative longitudinal motion of the two parts. As shown in FIGS. 8 and 9, the engaging lock 130 may include a rotational guide 172, an offsetting platform 174, and a lock actuator 176.

The rotational guide 172 may be a substantially plate-like element with a circular profile sized to fit within and rotate within the central cylindrical shell 140. The rotational guide 172 may include a plurality of bores 178 extending therethrough. The bores 178 may be on a bore circle matching that of the circumferentially extending slots 152 on the front plate 134 of the interfacing housing 128. As shown when comparing FIG. 6 to FIG. 7, the bores 178 may have a first diameter for receiving the dowels 124 from the proximal portion 102 and a second diameter for receiving pins of the relative rotation lock (i.e., pins arranged in the bores of the raised surface of the end effector interface). The second diameter may be larger than the first diameter and the transition from one bore size to the other may occur at a point along the length of the bore 178 extending through the rotational guide 172. The rotational guide 172 may also include a flattened side 180. As shown best in FIG. 8, the flattened side 180 may extend across the rotational guide 172 forming a circle segment that is substantially flush with the outside peripheral surface of the offsetting platform 174, for example. As shown in FIG. 9, the flattened side 180 may include one or more pin bores extending into the flattened side for receiving pins for a relative rotation lock for the fixture.

The offsetting platform 174 may be a circular raised surface extending longitudinally forward from the rotational guide 172. The offsetting platform 174 may help to position the lock actuator 176 within the hub or plug 120 of the interfacing housing 128 by reaching through the thickness of the front engagement plate 134 to position the lock actuator 176 therein.

The lock actuator 176 may be arranged on the offsetting platform 174. The lock actuator 176 may be configured for driving balls or other locking mechanisms 150 through the openings 148 of the hub or plug 120 on the interfacing housing 128 such that the balls or other locking mechanisms 150 engage the groove 118 on the proximal portion 102 of the coupling mechanism 100. As shown in FIGS. 6, 8, and 9, the lock actuator 176 may be generally star shaped when viewed from the front. That is, for example, the lock actuator 176 may have a thickness and outer diameter similar to the thickness of the hub or plug 120 on the interfacing housing such that the lock actuator 176 fits within the hub or plug 120. The peripheral surface of the lock actuator 176 may be defined by a plurality of sockets 182 having sloping ramps 184 extending therefrom. For example as shown in FIGS. 8 and 9, a curved ball socket 182 may be formed on a counterclockwise side of each star blade and a ramp 184 may extend further counterclockwise from the ball socket 182 generally linearly to the outer surface of the lock actuator 176 at a location substantially flush with the outer diameter of the offsetting platform 174.

In operation, the engaging lock 130 may function to secure the proximal portion 102 and the tool portion 104 to one another. For example, a ball 150 may rest in the ball socket 182 and be held in that position by partial engagement with the openings 148 in the hub 120 of the interfacing housing 128. In this position the engaging lock 176 may be unlocked (e.g., the balls are recessed within the openings 148 in the hub 120). The engaging lock 130 may rotate clockwise within the interfacing housing 128 relative to the housing 128 and relative to the ball 150, the ball 150 being held in place by the openings 148 in the hub 120. As the engaging lock 130 rotates clockwise, the ramps 184 on the outer surface of the lock actuator thereof may drive the ball 150 radially outward and partially through the openings 148 in the sidewall 146 of the hub 120. In this position, the lock actuator 130 may be locked (e.g., the balls 150 are driven radially outward to engage the groove 118 in the proximal portion 102 of the coupling mechanism 100).

Without more, the engaging lock 130 may rotate relatively freely at least between an unlocked position and a locked position. For purposes of restricting free motion of the lock actuator 130 and controlling alignment of the lock actuator 130 with other components, one or more relative rotation lock systems may be provided.

The first relative rotation lock system may be arranged between the lock actuator 130 and the end effector interface 132 and may control the relative rotation between the lock actuator 130 and other portions of the tool portion 104 of the coupling mechanism 100 and may be deemed an internal system. A second relative rotation lock system may be arranged between the tool portion 104 of the coupling mechanism 100 and the fixture 126 and may be deemed an external system.

With respect to the internal system, reference is made to FIGS. 6 and 7. As shown, an internal system may include a bias pin 186 configured to engage the back side of the engaging lock 130. That is, biased pins 186 may be arranged in the bores 170 on the raised portion 168 of the end effector interface 132. The pins 186 may be biased in a direction out of the bore 170 and in a direction toward the engaging lock 130 by a spring or other biasing mechanism 188. When the biased pins 186 are arranged in alignment with the bores 178 extending through the engaging lock 130 (e.g., when the tool portion 104 is positioned in the fixture 126), the pins 186 may advance into the bores 178 to a point where the bore narrows and the pins 186 may seat themselves partially in the bore 178 of the engaging lock 130 and partially in the bore 170 of the end effector interface 132. The pin 186 being partially arranged in each bore 170/178 may prevent relative rotation between the two elements. As such, in this condition, the engaging lock 130 may not rotate relative to the other portions of the tool portion 104 of the coupling mechanism 100. This may help to ensure that the engaging lock 130 is in a proper position when approached by a robot or tool arm for coupling, for example.

Figure 10:
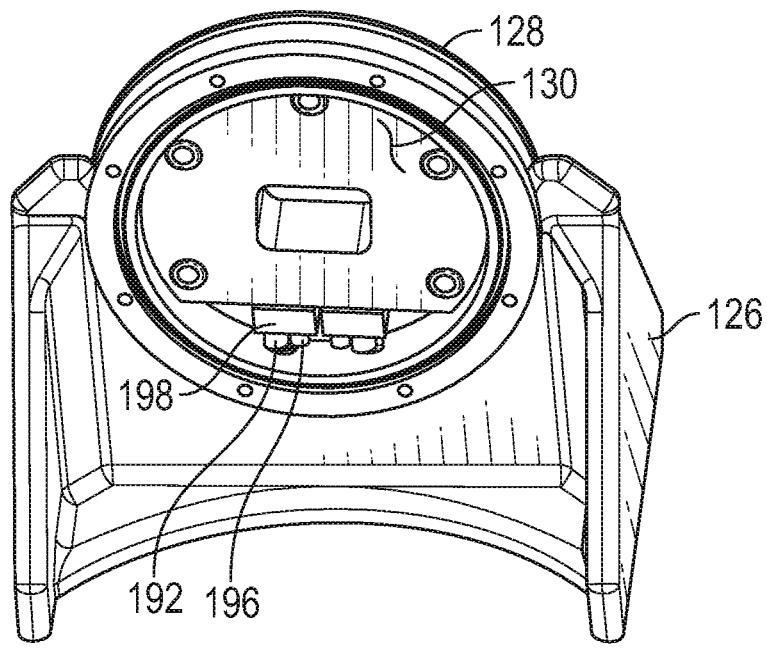
FIG. 10 is a rear perspective view of the tool portion of the coupling mechanism of FIG. 2, arranged in a fixture and having a portion removed to allow the external relative rotation lock system to be viewed, according to one or more embodiments.
Figure 11:
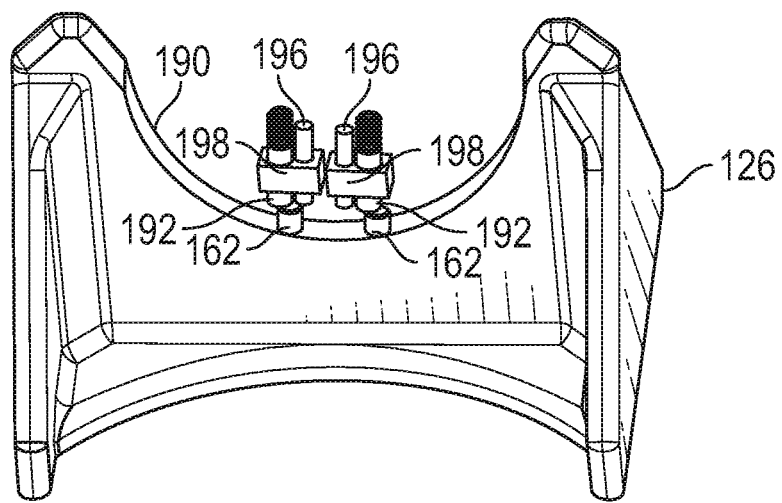
FIG. 11 is a rear perspective view thereof showing the external relative rotation lock system and the fixture, according to one or more embodiments.

With respect to the external system, reference is made to FIGS. 9-11. As best shown in FIG. 11, the fixture 128 may include a saddle 190 for receiving the tool portion 104 of the coupling mechanism 100. The saddle 190 may be sized and curved to provide for seating of the tool portion 104 of the coupling mechanism 100 by engagement with the groove or slot 138 on the outer peripheral surface of the interfacing housing 128. For example, a radiused or otherwise curved saddle 190 may be provided as shown. Alternatively, a rectangular or square saddle 190 may be provided. In still other embodiments, vertically extending bars or rods spaced from one another to allow the tool portion to slip between them may be provided and a separate chair, table, or stand may be provided between them that functions to engage the openings in the groove of the coupling mechanism. Still other saddle shapes may be provided. As shown, the fixture 126 may include one or more pins or dowels 162 extending upward and radially inward from the saddle. The pin or dowel 162 may be adapted to engage the openings 160 on the groove 138 to prevent relative rotation of the tool portion 104 when the tool portion 104 is seated in the fixture 126. This may allow for stationary positioning of the tool portion 104 such that the robot or tool arm may release or engage the tool without translation or rotation.

Thus far, we have discussed preventing relative rotation of the internal engaging lock 130 and relative rotation of the tool portion 104 when the tool is positioned in the fixture 126. For purposes of resisting or preventing rotation when the tool is in use, one or more biased locking pins 192 may be arranged within the interfacing housing 128 between the groove 138 and the engaging lock 130 arranged therein. When the tool portion 104 is engaged by the proximal portion 102, the biased locking pins 192 may be arranged in line with the openings 160 in the groove 138 of the interfacing housing 128 and the biased nature of the pins 192 may cause them to extend through the openings 160 in the groove 138. The position of the pins 192 in the engaging lock 130 and through the interfacing housing 128 may prevent relative rotation of the engaging lock 130 and the interfacing housing 128 during use.

More particularly, as shown in FIG. 9, a biased locking pin 192 may be arranged in a bore 194 in the bottom of the engaging lock 130. As shown, two biased locking pins 192 are shown. The pin 192 may function to extend through the openings 160 in the groove 138 of the interfacing housing 128 when the engaging lock 130 is rotated clockwise and the tool portion 104 is not in the fixture 126. In addition, a guide pin 196 and block 198 may be provided to assist with maintaining alignment of the locking pin 192. That is, for example, a block 198 may be secured to the locking pin 192. The block 198 may include a sleeve bore therethrough that is parallel to the locking pin 192. A guide pin 196 may be secured to the engaging lock 130 adjacent and parallel to the locking pin 192 and extending out of the bottom of the engaging lock 130. The guide pin 196 may extend through the sleeve bore in a sliding engagement such that the block 198 and locking pin 192 may travel together along the guide pin 196 in an aligned fashion. In addition to guiding the travel of the locking pin 192, the block 198 may also function as a stop to hold the biased locking pin 192 from extending too far through the openings 160 and/or from falling out. That is, the block 198 may engage the inner surface of the groove 138 of the interfacing housing 128, for example, to prevent excessive travel of the locking pin 192. Alternatively or additionally, a biased locking pin 192 with a wider head may be provided. A constraining housing around the locking pin 192 may also be provided.

Figure 12:
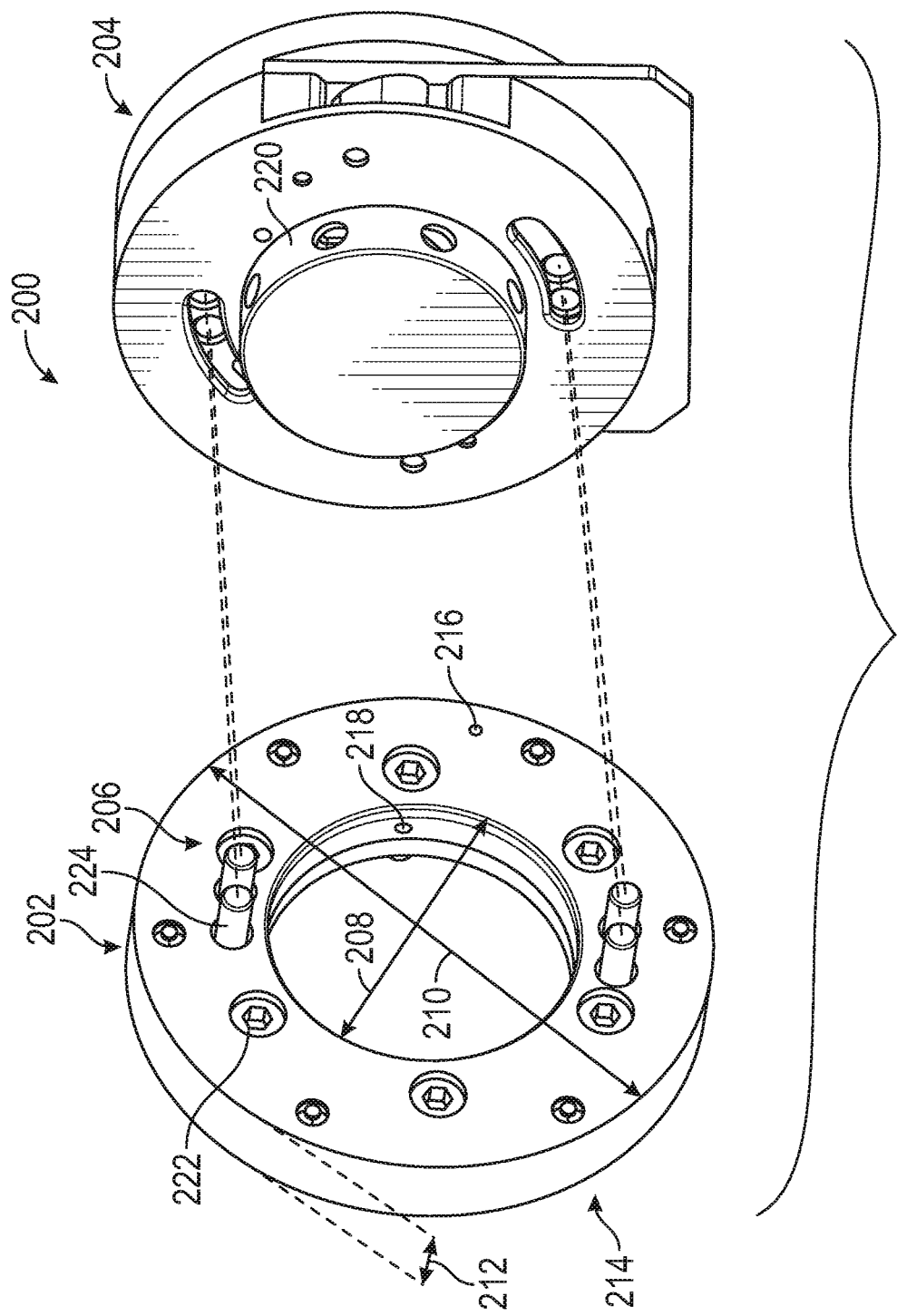
FIG. 12 is a perspective view of another coupling mechanism, according to one or more embodiments.

Another embodiment of a coupling mechanism 200 is shown beginning at FIG. 12. This embodiment, may function generally similarly to the coupling mechanism of FIGS. 1-11 where an engaging lock 230 actuates catches 250 that protrude out through a cylindrical sidewall 247 of coupling plug 220 to engage a groove 218 in a body portion 206 of a proximal portion 202. However, particular features relating to controlling the movement of the engaging lock 230 when the mechanism 200 is in the fixture 226 and out of the fixture 226 may differ.

As shown in FIG. 12, the coupling mechanism 200 may include a proximal portion 202 and a tool portion 204. The proximal portion 202 may be affixed to the wrist 58 of the robot 50 or tool arm, for example. The tool portion 204 may be arranged on an end effector 60 and may be adapted for selective engagement by the proximal portion 202.

With continued reference to FIG. 12, the proximal portion 202 may be configured to selectively engage the tool portion 204 of the coupling mechanism 200. The proximal portion may include a body portion 206 adapted for attachment to the robot 50 or tool arm. The body portion 206 may include a plate or other shape adapted for placement against and attachment to the wrist 58 of the robot 50 or tool arm. In one or more embodiments, the body portion 206 may include an annularly shaped plate with an outer diameter 210, an inner diameter 208, and a thickness 212. The outer diameter 210 may be selected to be the same, slightly smaller, and/or slightly larger than the wrist 58 and the inner diameter 208 may be selected to receive a coupling plug 220 of the tool portion 204. The thickness may be selected to receive the coupling plug 220 of the tool portion 204 and to allow for engagement with the coupling plug 220 on an inner surface thereof. The body portion may include a back face 214 adapted for securing against the wrist of the robot or tool arm and a front face 216 adapted for engaging the tool portion 204 of the coupling mechanism 200. The thickness 212 of the body portion 206 may establish an outside wall and an inside wall. The outside wall may be arranged along the outside diameter and may extend from the back face 214 to the front face 216 forming a substantially cylindrical outer surface. Similarly, the inside wall may be arranged along the inside diameter and may extend from the back face 214 to the front face 216. The inside wall may include a groove 218 extending around the length of the inside wall. The groove 218 may be adapted to receive a catch or ball 250 from the coupling plug 220 of the tool portion 204 to cause the proximal portion 202 and the tool portion 204 to lockingly engage.

In one or more embodiments, the body portion 206 may include a plurality of bores 222 extending through the body portion from the front face to the back face and adapted to receive fasteners to secure the body portion to the wrist of the robot or tool arm, for example. The body portion 206 may also include a plurality of protruding engagement features 224 extending from the front face 216 and adapted to engage with the tool portion 204 and trigger a locking mechanism. In one or more embodiments, the protruding engagement features 224 may include a plurality of dowels arranged along a circle having a diameter between the inner and outer diameters of the body portion 206. In one or more embodiments, the front face 216 may be a substantially flat face and the dowels may extend substantially perpendicular to the front face 216. The dowels may be spaced along the circle so as to engage openings in the tool portion 204.

Figure 13:
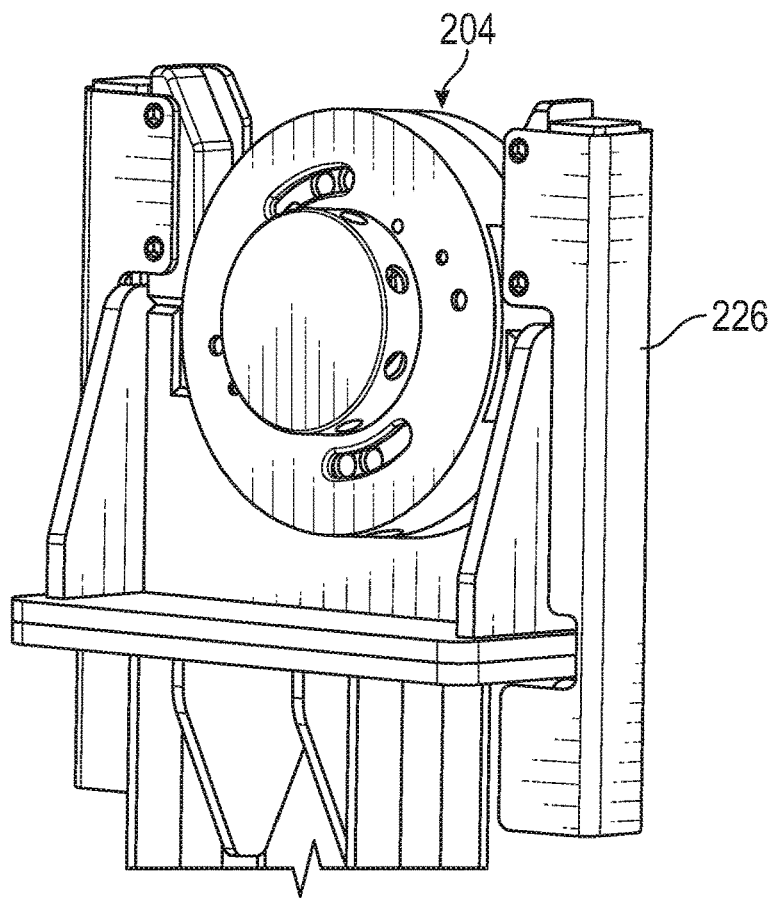
FIG. 13 is a perspective view of a tool portion of the coupling mechanism of FIG. 12 arranged in a fixture, according to one or more embodiments.
Figure 14:
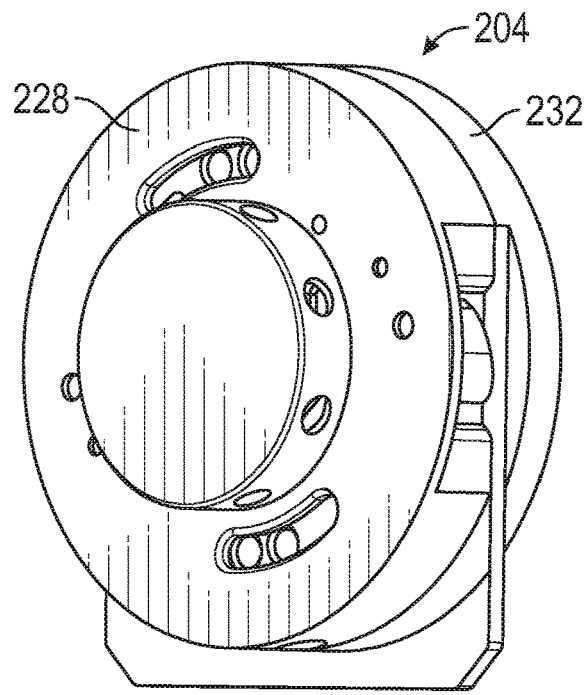
FIG. 14 is a perspective view of the tool portion of the coupling mechanism of FIG. 12, according to one or more embodiments.
Figure 15:
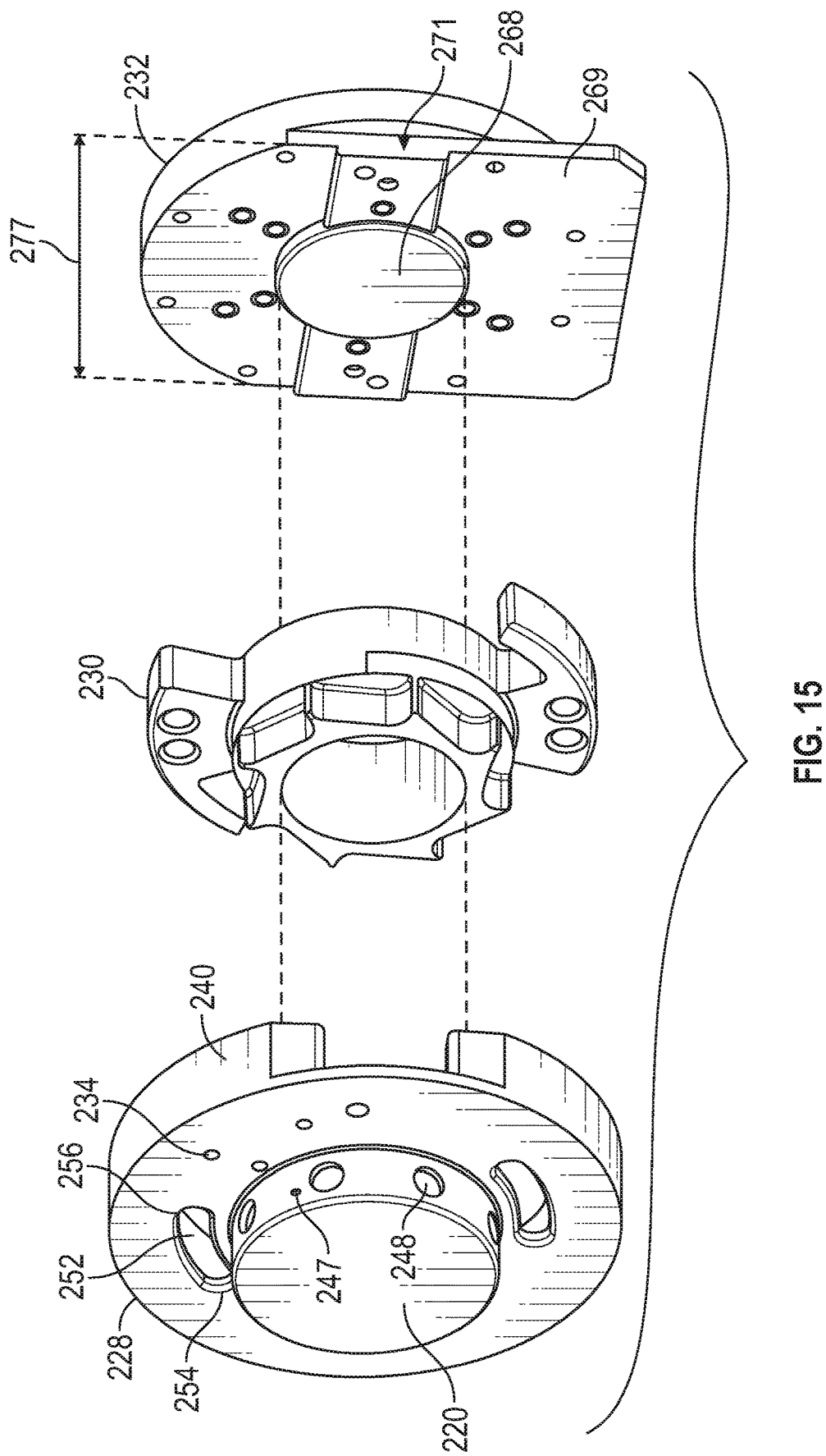
FIG. 15 is an exploded view thereof.
Figure 16:
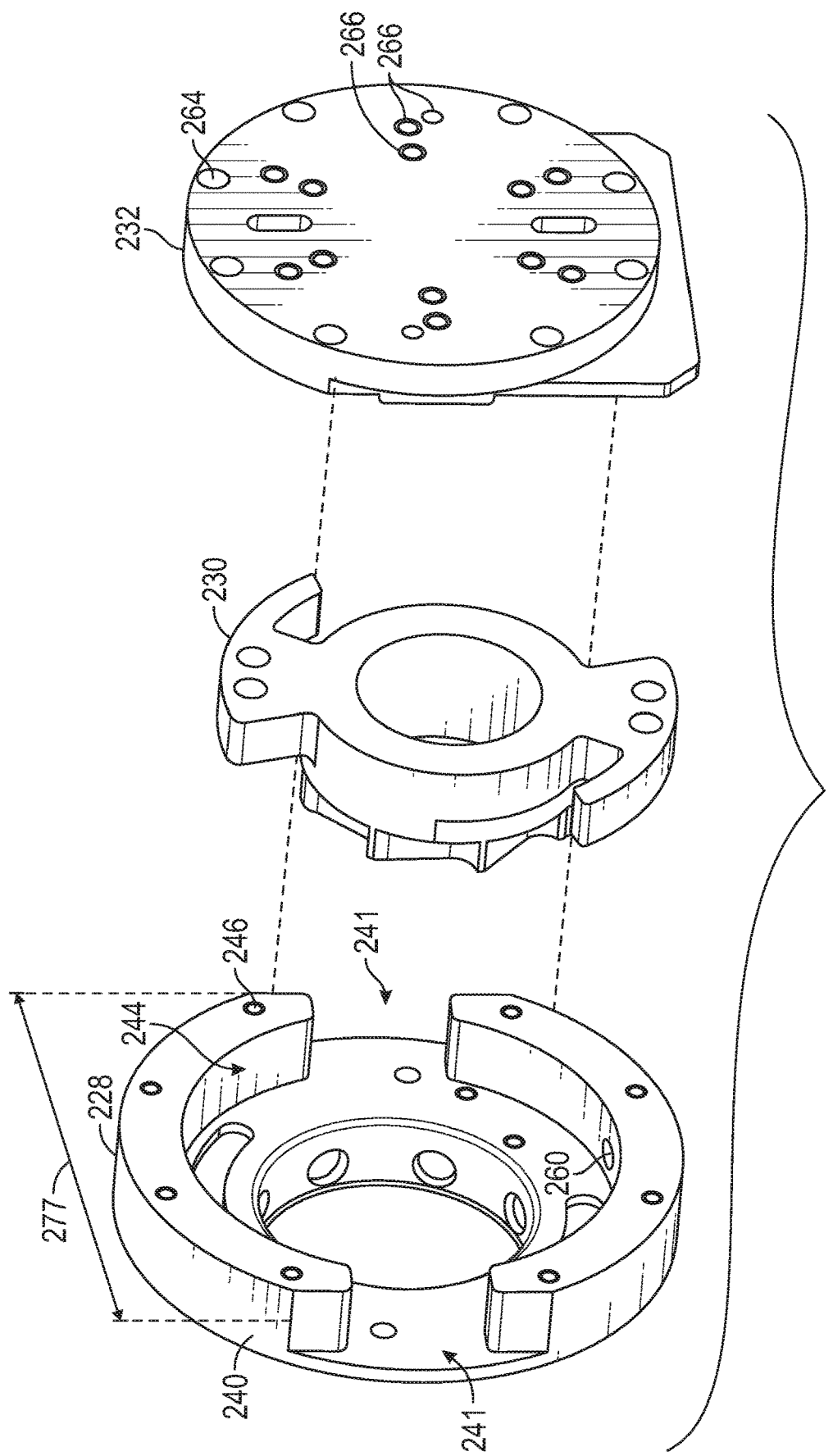
FIG. 16 is an additional exploded view thereof.

The tool portion 204 is shown in FIG. 13 arranged in a fixture 226. While an end effector is not shown, the tool portion 204 may have an end effector 60 secured to a back side thereof similar to tool portion 104. The tool portion 104 may be configured for resting in a fixture 226 as shown and for being resistant to rotation in the fixture 226. The tool portion 204 may be adapted for engagement by a robot or other tool arm or controlling device in the fixture 226 and lifting from the fixture by the robot, tool arm, or controlling device. The tool portion 204 may also be adapted to couple with the proximal portion 202 in secure fashion to withstand the pushing and pulling forces generated from operations of the robot, tool arm, or controlling device and, in some cases, the end effector handling tubulars. FIG. 14 shows a perspective view of the tool portion 204 and FIGS. 15 and 16 show perspective exploded views of the tool portion 204. As shown, the tool portion 204 may include an interfacing housing 228, an engaging lock 230, an end effector interface 232, and one or more relative rotation lock systems may be provided.

The interfacing housing 228 is shown in FIGS. 14-16. The interfacing housing 228 may be adapted to engage with the proximal portion 202 of the coupling mechanism 200 and may function together with the end effector interface 232 to engage the fixture 226. As shown, the interfacing housing 228 may include a front engagement plate 234. Unlike the interfacing housing 128, the interfacing housing 228 might not include a back engagement plate. The front engagement plate 234 may be annularly shaped and may extend radially outward from the coupling plug 220 to an outer peripheral edge. A peripheral wall 240 may be arranged along the outer peripheral edge. Together, the front engagement plate 234 and the peripheral wall 240 may define an internal cavity 244. As shown, the peripheral wall 240 may be relatively thick and may include a plurality of bores 246 each for receiving a fastener to connect the interfacing housing 228 to the end effector interface 232. In addition, the peripheral wall 240 may include access gaps 241 on the sides of the interfacing housing 228. The access gaps 241 may provide openings in the tool portion 204 that allow lock control flaps 243 (see FIGS. 18 and 19) to be engaged by the fixture 226 when the tool portion 204 is placed therein. That is, the access gaps 241 may allow lock control flaps 243 to extend beyond the perimeter of the peripheral wall 240 unless the tool portion 204 is placed in the fixture 226 where the fixture 226 may force the flaps 243 within the tool portion 204.

The interfacing housing 228 may also include a hub or plug 220 extending longitudinally from an inner radial edge of the front engagement plate 234. The hub or plug 220 may be sized and shaped to engage the body portion 206 of the proximal portion 202 of the coupling mechanism 200. That is, the hub or plug 220 may have a diameter selected to be slightly smaller than the inner diameter of the annularly shaped body portion 206 of the proximal portion 202, for example. The hub or plug 220 may also extend from the front engagement plate 234 by a distance similar to the thickness or slightly less than the thickness 212 of the body portion 206 of the proximal portion 202. The hub or plug 220 may have a cylindrical sidewall 247 including a plurality of openings 248 spaced along the periphery of the hub or plug 220 and extending through the sidewall 247. The openings 248 may be sized and shaped to allow actuated catches 250 to extend partially therethrough so as to engage the groove 218 on the inside wall of the body portion 206 of the proximal portion 202 of the coupling mechanism 200. That is, for example, the openings 248 may have a diameter slightly smaller than an engagement ball such that the ball may extend partially through the opening 248 and seat in the groove 218 of the proximal portion 202, but the opening 248 may prevent full exit of the catches or balls 250.

As shown, the interfacing housing 228 may include a plurality of circumferentially extending slots 252 extending through the front engagement plate 234. The slots 252 may be adapted to receive the dowels 224 from the proximal portion 202 and, as such, may be arranged on a diameter that is the same or similar to the diameter of the circle on which the dowels 224 of the proximal portion 202 are arranged. The diameter of the circle may be, for example, smaller than the diameter of the peripheral wall 240. The slots 252 may be kidney shaped, for example, so as to allow for rotation of the dowels 224 relative to the front engagement plate 234 after the dowels 224 are inserted into the slots 252. The dowels may be used to actuate the engaging lock 230 by insertion through the slots 252 and rotating relative to the front engagement plate 234. Referring to FIG. 15, in one or more embodiments, the kidney shaped slots may have an initial engagement end 254 and a locking end 256. That is, the dowels 224 from the proximal portion 202 may be inserted into the slots 252 at an initial engagement end 254 and then the dowels 224 may be rotated clockwise to a locking end 256 of the slots 252.

As best shown in FIG. 16, the interfacing housing 228 may include one or more openings 260 extending into and/or through the peripheral wall 240. The openings 260 may be adapted to allow fixture dowels to pass therethrough to rotationally secure the tool portion 204 to the fixture 226. In one or more embodiments, the openings 260 may be arranged through a bottom portion of the peripheral wall 240. In other embodiments, other positions may be used.

The end effector interface 232 may be arranged on an end of the tool portion 204 opposite the interfacing housing 228 and may provide a backing and attachment surface for the housing 228. The end effector interface 232 may close off the internal cavity 244 creating an internal operating space for the engaging lock 230 and the lock control flaps 243. The end effector interface 232 may include a relatively thick and substantially plate-like element having a circumferential bore circle near an outer peripheral edge. The bore circle may have a diameter that is the same or similar to the diameter of the circle on which the openings 246 along the peripheral wall 240 are arranged. A plurality of bores 264 may be spaced along the bore circle to align with the openings 246 on the peripheral wall 240. The relatively thick end effector interface secured to the relatively thick peripheral wall 240 may provide for a substantial component for securing the end effector. The back of the end effector interface 232 (e.g. the side facing the end effector and away from the robot or tool arm) may include a plurality of bores 266 for securing an end effector 60. The bores 266 may be threaded bores for bolting an end effector 60 thereto, for example.

The end effector interface 232 may also include a raised surface 268 on a front side thereof. The raised surface 268 may be circular and adapted to nest within an inner bore of the engaging lock 230 and perform a centering function for the engaging lock 230. A substantially rectangular raised surface may also be provided for securing the lock control flaps 243. The end effector interface may also include guide notches 271 on lateral sides of a front face. The guide notches 271 may define a width 277 across the front face of the end effector interface that is adapted to fit into the fixture 226. The peripheral wall 240 may have a same or similar width 277 along the guide notches 271 so as to similarly accommodate the fixture 226. The end effector interface 232 may also include a downwardly extending rotational guide 269. The guide 269 may have a width substantially the same as the width defined by the guide notches 271 and may be adapted to slip into the fixture 226 below the tool portion 204 and maintain the tool portion in vertical alignment as it exits the fixture unless/until the engaging lock 230 is held in position by the lock control flaps 243.

Figure 17:
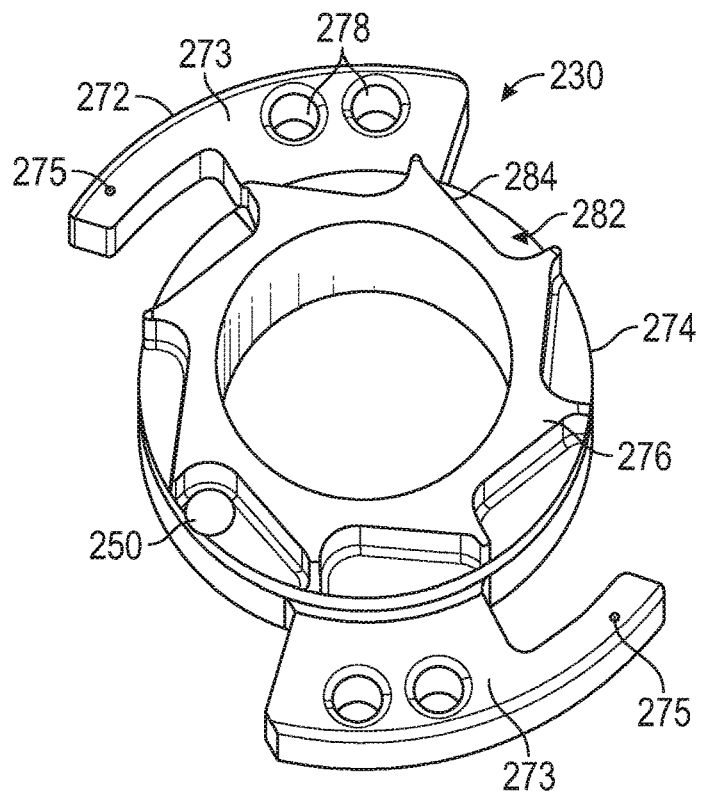
FIG. 17 is a perspective view of an engaging lock of the tool portion of the coupling mechanism of FIG. 12, according to one or more embodiments.

The engaging lock 230 is also shown in FIGS. 15 and 16 and an isolated perspective view is shown in FIG. 17. As shown, the lock 230 is sized and adapted to fit within the cavity 244 of the interfacing housing 228. The engaging lock 230 may be configured for rotation within the cavity 244 to cause the tool portion 204 of the coupling mechanism 200 to lockingly engage the proximal portion 202. In particular, the engaging lock 230 may rotate to drive locking balls 250 outward through the openings 248 in the cylindrical sidewall of the hub 220 of the interfacing housing 228. The balls 250 may engage the groove 218 on the inside wall of the body 206 of the proximal portion 202 of the coupling mechanism 200 thereby preventing relative longitudinal motion of the two parts. As shown in FIGS. 15-17, the engaging lock 230 may include a rotational guide 272, an offsetting platform 274, and a lock actuator 276.

The rotational guide 272 may be a substantially plate-like element or a pair of plate like elements defining a circular peripheral edge sized to fit within and rotate within the peripheral wall 240 defining the cavity 244. The rotational guide 272 may include a plurality of bores 278 extending therethrough. The bores 278 may be on a bore circle matching that of the circumferentially extending slots 252 on the front plate 234 of the interfacing housing 228. As shown, the bores 278 may include a pair of bores 278 arranged on respective ear portions of the guide 272. A first set of bores 278 may be arranged on one side of the guide 272 and another set of bores 278 on an opposite side of the guide 272. This may be in contrast to the fuller circular guide 172 and the more uniformly arranged bores 178. However, either paired up or more uniformly arranged bores may be used. In this case, the ear-type guide 272 and paired up bores 278 may provide space for operation of the lock control flaps 243. That is, as shown best in FIG. 17, the rotational guide 272 may include upper and lower ear portions 273. The ear portions may have a radiused outer edge configured for engaging an inner surface of the peripheral wall and may have radially extending sides defining ear portions having a shape akin to an outer portion of a piece of pie. The ear portions may also include trailing tails 275 adapted to be engaged the lock control flaps 243 when the tool portion 204 is out of the fixture 226. The trailing tails 275 may have a peripheral outer surface that is a circumferential continuation of the outer surface of the ear portions 273 and an inner surface defining a tail width narrower than the ear width and extending about the center of the guide.

The offsetting platform 274 may be a circular raised surface extending longitudinally forward (e.g., toward the robot or tool arm) from the rotational guide 272. The offsetting platform 274 may help to position the lock actuator 276 within the hub or plug 220 of the interfacing housing 228.

The lock actuator 276 may be arranged on the offsetting platform 274. The lock actuator 276 may be configured for selectively driving balls or other locking mechanisms 250 through the openings 248 of the hub or plug 220 on the interfacing housing 228 such that the balls or other locking mechanisms 250 engage the groove 218 on the proximal portion 202 of the coupling mechanism 200. As shown in FIGS. 15-17, the lock actuator 276 may be generally star shaped when viewed from the front. That is, for example, the lock actuator 276 may have a thickness and outer diameter similar to the thickness of the hub or plug 220 on the interfacing housing such that the lock actuator 276 fits within the hub or plug 220. The peripheral surface of the lock actuator 276 may be defined by a plurality of sockets 282 having sloping ramps 284 extending therefrom. For example as shown in FIG. 17, a curved ball socket 282 may be formed on a counterclockwise side of each star blade and a ramp 284 may extend further counterclockwise from the ball socket 282 generally linearly to the outer surface of the lock actuator 276 at a location substantially flush with the outer diameter of the offsetting platform 274.

In operation, the engaging lock 230 may function to secure the proximal portion 202 and the tool portion 204 to one another. For example, a ball 250 may rest in the ball socket 282 and be held in that position by partial engagement with the openings 248 in the hub 220 of the interfacing housing 228. In this position the engaging lock 276 may be unlocked (e.g., the balls are recessed within the openings 248 in the hub 220). The engaging lock 230 may rotate clockwise within the interfacing housing 228 relative to the housing 228 and relative to the ball 250, the ball 250 being held in place by the openings 248 in the hub 220. As the engaging lock 230 rotates clockwise, the ramps 284 on the outer surface of the lock actuator thereof may drive the ball 250 radially outward and partially through the openings 248 in the sidewall 246 of the hub 220. In this position, the lock actuator 230 may be locked (e.g., the balls 250 are driven radially outward to engage the groove 218 in the proximal portion 202 of the coupling mechanism 200).

Figure 18:
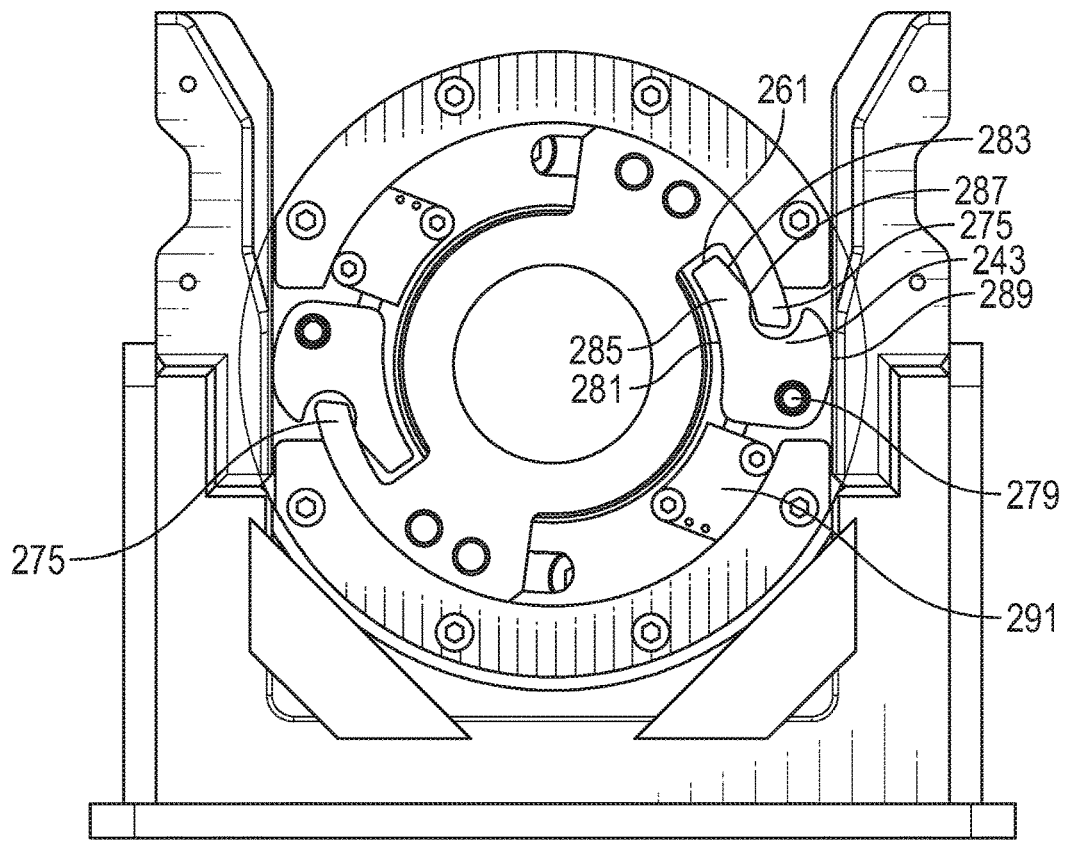
FIG. 18 is a back side break away view of the tool portion arranged in the fixture showing the lock control flaps a releasing position, according to one or more embodiments.
Figure 19:
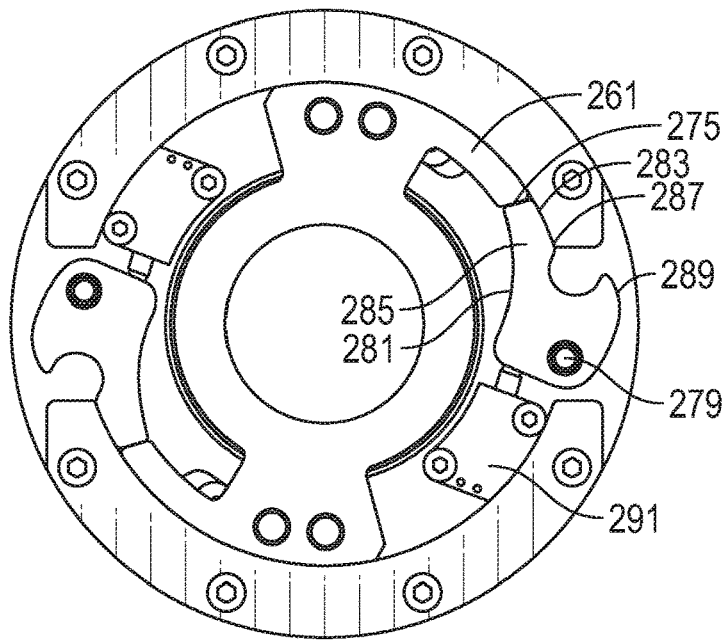
FIG. 19 is a back side break away view of the tool portion removed from the fixture showing the lock control flaps in a holding position, according to one or more embodiments.

Without more, the engaging lock 230 may rotate relatively freely at least between an unlocked position and a locked position. For purposes of restricting free motion of the lock actuator 230 and controlling alignment of the lock actuator 230 with other components, one or more relative rotation lock systems may be provided. While the coupling mechanism 100 included first and second relative rotation lock systems and a series of bias pins 192, the present coupling mechanism may, more simply, include a single relative rotation lock system. That is, as shown in FIGS. 18 and 19, a pair of lock control flaps 243 may be provided to control the rotation of the lock 230. As shown in FIG. 18, the coupling mechanism 200 may be arranged in the fixture 226 and the lock control flaps 243 may be forced inwardly by the fixture in a release position. In FIG. 19, the coupling mechanism 200 may be removed from the fixture and the lock control flaps 243 may be biased outwardly into a holding position. In this position, noses 261 of the lock control flaps may abut the tails 275 of the lock 230 and hold the lock 230 in position against rotation.

With continued reference to FIGS. 18 and 19, the relative rotation lock system may be described in more detail. As shown, the lock control flaps 243 may include generally J-shaped elements having a pivot pin 279 arranged near a toe of the J-shape at or near the bottom of the up-turned hook portion of the shape. The vertical leg of the J-shape may include an inner surface 281 (e.g., inner relative to the center of the coupling mech) that is curved to follow, but remain spaced apart from, the outer surface of the offsetting platform 274 in the release position shown in FIG. 18. The outer surface 283 (e.g., outer relative to the center of the coupling mech) of the vertical leg 285 may also be curved near a top portion thereof and be adapted to nest against the inside surface of the peripheral wall 240 in the holding position shown in FIG. 19. Moreover, the curve may extend downward along the vertical leg 285 and curve further inward (e.g., relative to the J shape) near the bottom portion of the leg forming a bite surface or point 287. As shown in FIG. 18, this bite surface or point 287 may engage an inside surface of the tail 275 of the lock 230 when the mechanism 200 is in the fixture 226. The outside surface 289 of the hooked portion of the J-shape may include a curved cam surface adapted to be engaged by the fixture 226 to cause the lock control flaps to rotate about the pivot pin 279 as the tool portion 204 is placed into the fixture 226. As shown, each of the lock control flaps 243 may include a biasing mechanism 291 arranged under a heel portion of the J-shape. The biasing mechanism 291 may include a biasing pin that is urged against the heel of the J-shape with a biasing device such as a spring or other resilient member or device. The biasing force from the biasing device may cause the J-shape to have a natural or biased position toward the holding position shown in FIG. 19. This biasing force may be overcome when the tool portion 204 is placed in the fixture 226 and the cam surfaces 289 ride along the guide surfaces of the fixture 226 causing the lock control flaps 243 to rotate about the pivot pin 279 against the biasing force to the position shown in FIG. 18.

Figure 20:
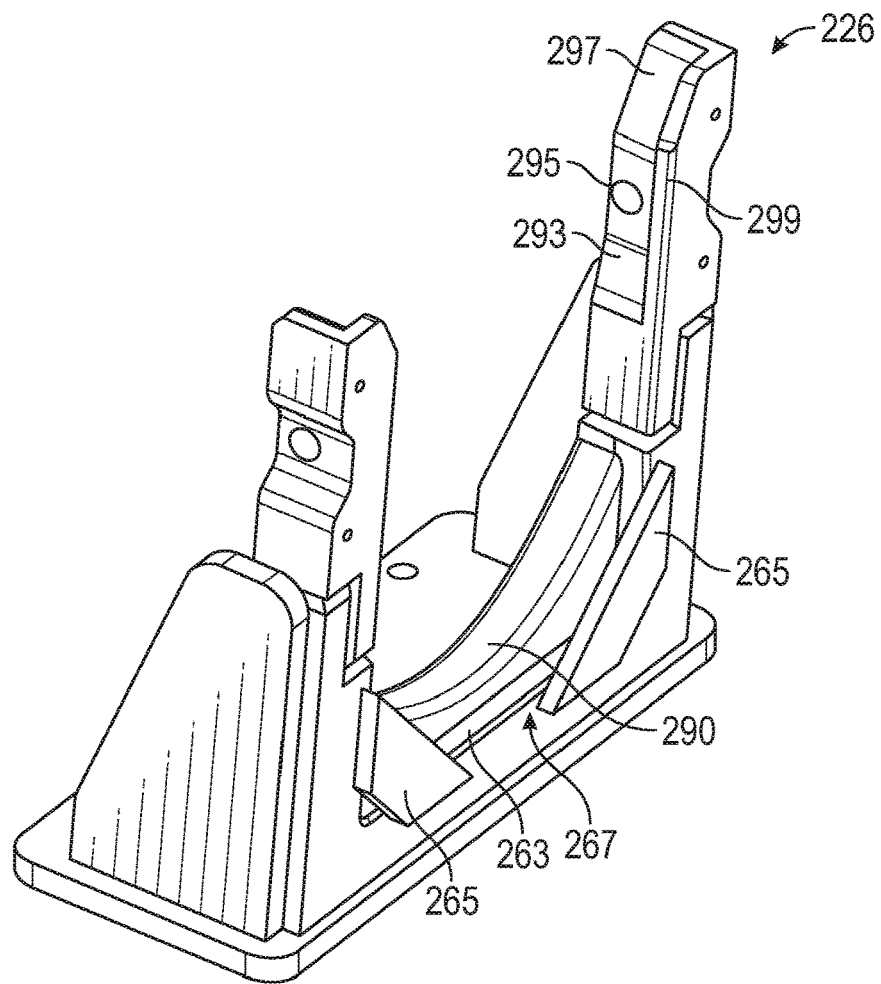
FIG. 20 is a perspective view of a fixture for the coupling mechanism of FIG. 12, according to one or more embodiments.
Figure 21:
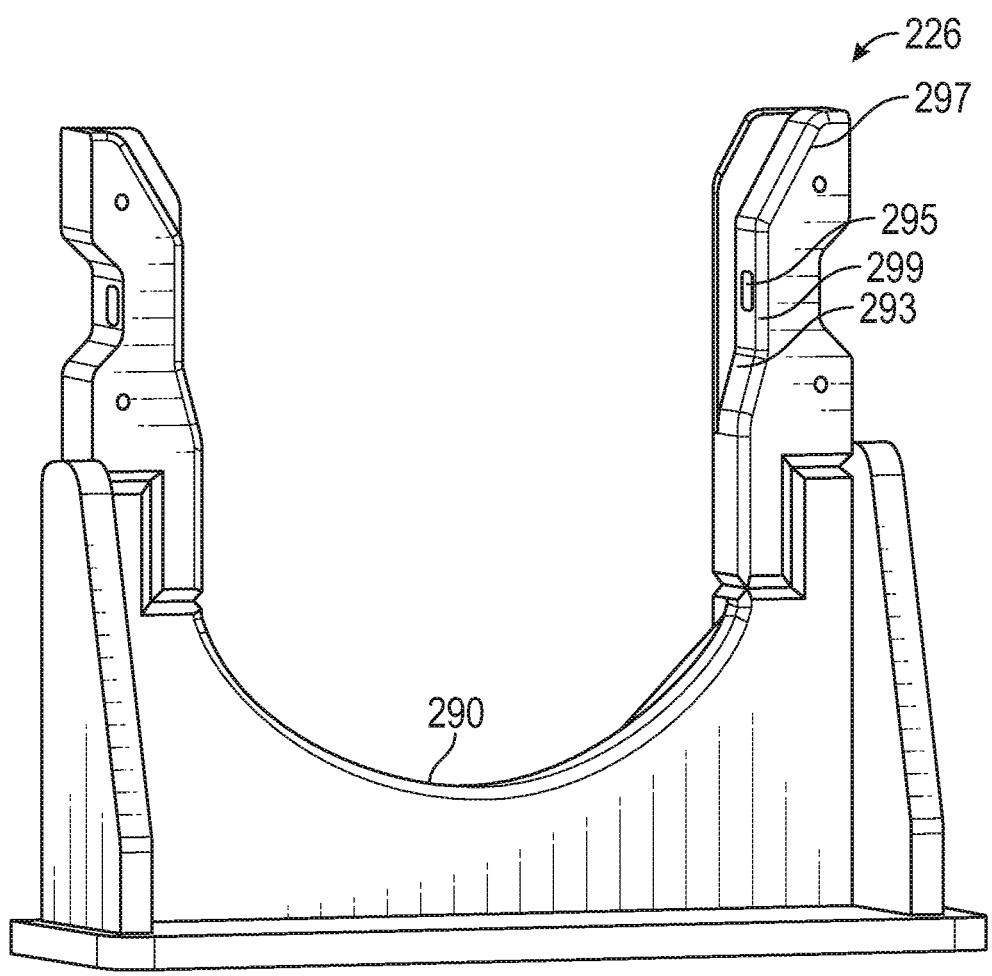
FIG. 21 is another perspective view of the fixture of FIG. 21, according to one or more embodiments.

Turning now to FIGS. 20 and 21, the fixture 226 may include a saddle 290 for receiving the tool portion 204 of the coupling mechanism 200. The saddle 290 may be sized and curved to provide for seating of the tool portion 204 of the coupling mechanism 200 by engagement with an outside surface of the peripheral wall 240. For example, a radiused or otherwise curved saddle 290 may be provided as shown. The sides of the saddle may extend upward substantially vertically to diverging ramps 293 that extend outward and upward to vertically extending guide walls 295, which extend further upward to centering ramps 297 that also diverge and extend outward and upward. Out of plane, but adjacent to the saddle and the series of ramps and guide walls, a guide rib 299 may be provided. Still further, adjacent the saddle and in line with the guide rib, a plate slot 267 may be provided. The slot 267 may be created by a pair of diagonally extending brace plates 265 and a groove or slot 263 in a base plate of the fixture 226. While a curved saddle 290 has been described, alternatively, a rectangular or square saddle 290 may be provided. In still other embodiments, vertically extending bars or rods spaced from one another to allow the tool portion to slip between them may be provided and a separate chair, table, or stand may be provided between them. Still other saddle shapes may be provided.

In operation and use, a robot or user using a tool arm or other rotatable device may engage or release an end effector or other tool using the described coupling mechanisms 100/200. That is, with reference back to FIGS. 1 and 13, for example, the robot or user may place the end effector it is currently coupled to in the empty fixture and release the end effector. The robot or user may then engage the end effector in another fixture, couple to the end effector, and remove the end effector from the fixture such that a different end effector may be used to manipulate pipe or tubulars or perform other operations. A more detailed discussion below with respect to each type of coupling mechanism 100/200 may help to describe the decoupling and coupling process.

Figure 22A:
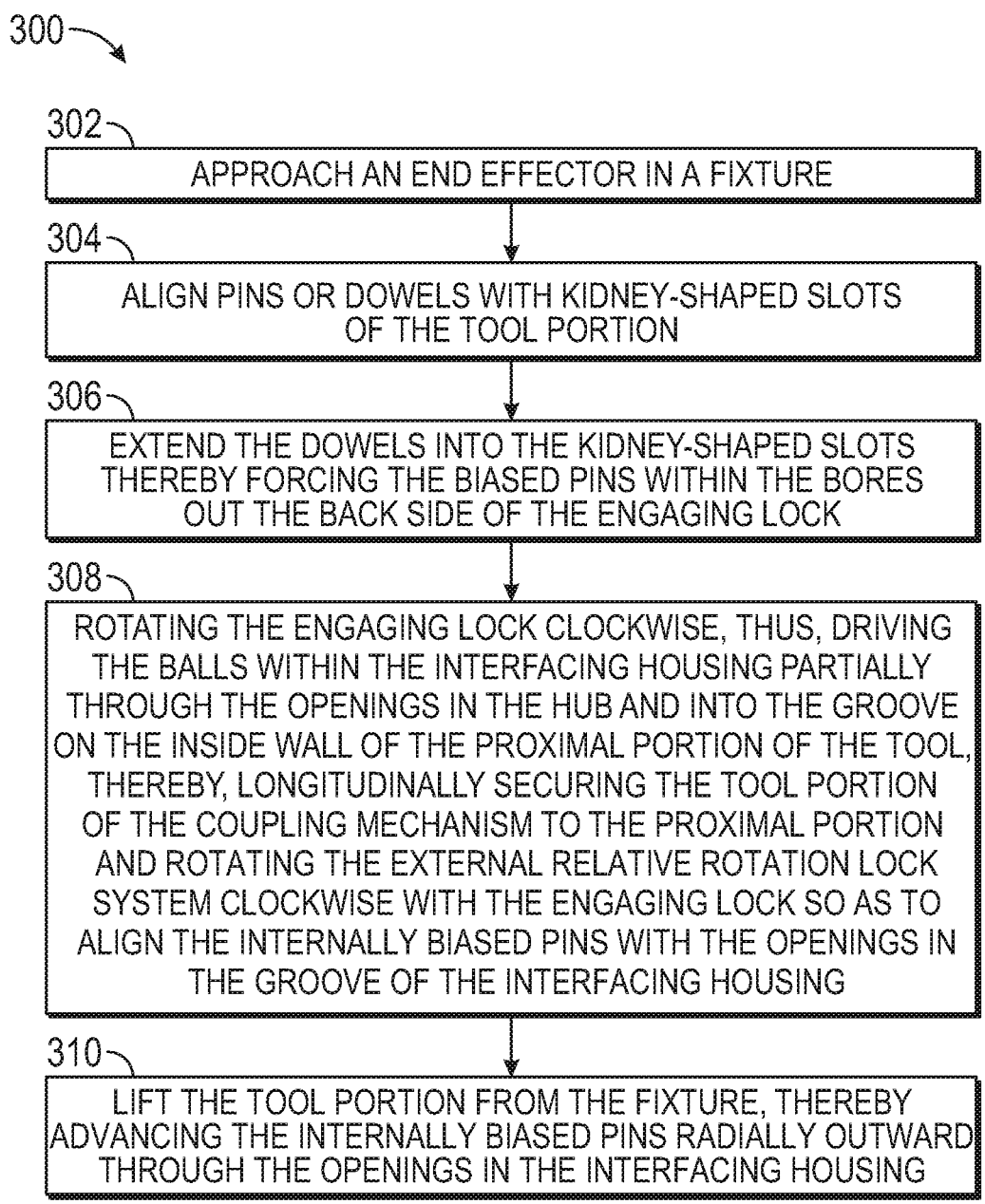
FIG. 22A is a method diagram depicting a method of engaging a tool, according to one or more embodiments.

A robot or user may couple to an end effector or other tool using a method of coupling 300 as shown in FIG. 22A. For example, a robot or user with a tool arm or other rotatable item may approach an end effector in a fixture (302). The robot or tool arm may include a proximal portion 102 of a coupling mechanism 100 secured to a wrist thereof and the end effector may be secured to or include the tool portion 104 of the coupling mechanism 100. As the robot or tool arm approaches, the pins or dowels extending from the proximal portion 102 of the coupling mechanism may be aligned with the kidney-shaped slots of the tool portion 104. (304) In particular, the dowels may be aligned with a counterclockwise end of the kidney-shaped slots. In the fixture position, the engaging lock 130 of the tool portion 104 may be positioned in its most counterclockwise position and the biased pins between the end effector interface and the engaging lock may be engaged with a back side of the bores in the engaging lock. The robot or tool arm may engage the tool portion by extending the dowels into the kidney-shaped slots thereby forcing the biased pins within the bores out the back side of the engaging lock. (306) This may free up the engaging lock 130 within the tool portion for rotation. The tool portion may, however, remain resistant to rotation relative to the fixture due to the dowels extending into the tool portion from the fixture. The robot or tool arm may rotate the engaging lock clockwise. (308) This process may drive the balls within the interfacing housing partially through the openings in the hub and into the groove on the inside wall of the proximal portion of the tool thereby longitudinally securing the tool portion of the coupling mechanism to the proximal portion. Moreover, upon rotating the engaging lock, the external relative rotation lock system may be rotated clockwise so as to align the internally biased pins with the openings in the groove of the interfacing housing. The robot or tool arm may then lift the tool portion from the fixture (310) and the internally biased pins may advance radially outward through the openings in the interfacing housing and preventing relative rotation of the engaging lock and the remaining portions of the tool portion of the coupling mechanism. It is to be appreciated that the biased pins may enter the openings simultaneously with the fixture pins exiting the openings. The wall thickness of the grooved portion of the interfacing housing together with its sloping nature as you move away from the centerline of the fixture may provide a sufficiently long bore to ensure that the internal biased pins enter the openings before the tool portion is fully free from the fixture. Upon lifting the tool portion and its attached end effector from the fixture, the tool portion may be both longitudinally and rotationally secured to the proximal portion.

Figure 22B:
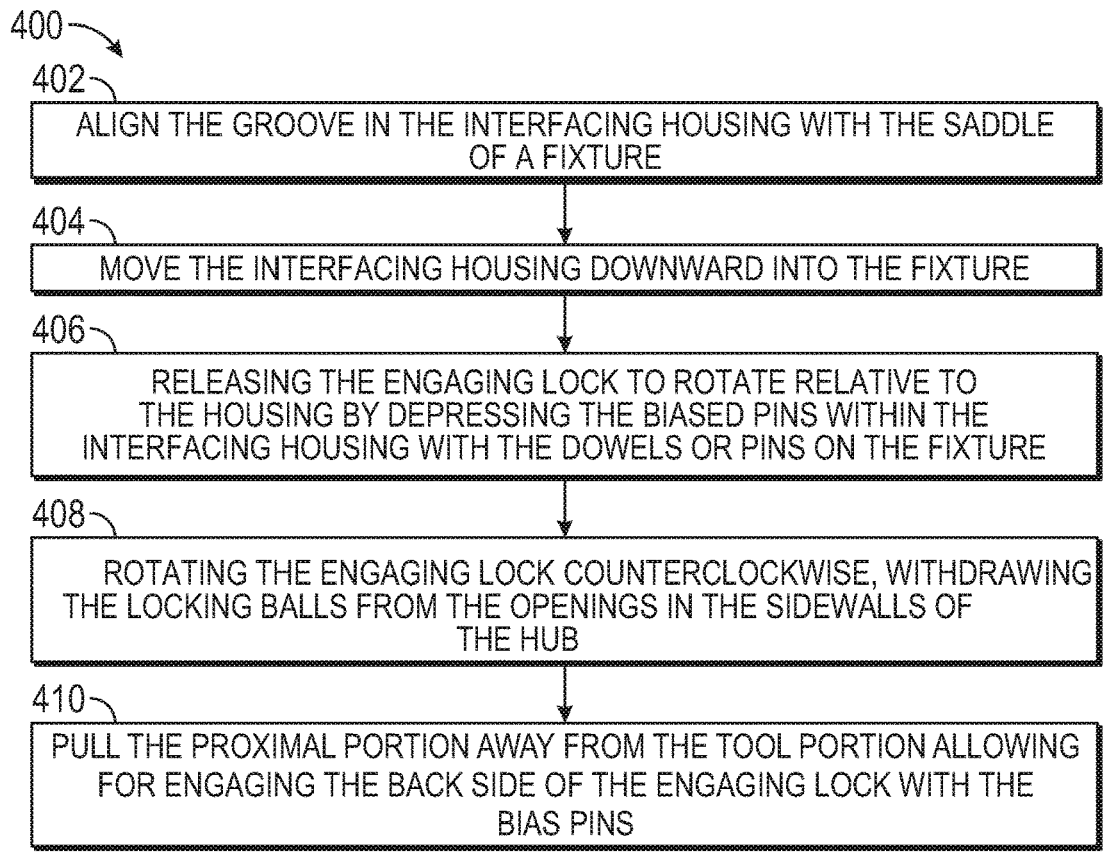
FIG. 22B is a method diagram depicting a method of disengaging a tool, according to one or more embodiments.

To release or decouple from an end effector, the robot or user may perform a method of decoupling 400 as shown in FIG. 22B. For example, the robot or user may align the groove in the interfacing housing with the saddle of a fixture (402) and move the interfacing housing downward into the fixture (404). The front and back engagement plate of the interfacing housing may sandwich the saddle plate of the fixture. Also, the dowels or pins on the fixture may depress the biased pins within the interfacing housing on the bottom of the engaging lock, thus, releasing the engaging lock to rotate relative to the housing. (406) The robot or user using a tool arm may rotate the engaging lock counterclockwise. (408) The force from the sloping surfaces on the lock actuator may subside due this rotation, leaving the balls to be free to withdraw from the openings in the sidewalls of the hub thereby longitudinally freeing the tool portion from the proximal portion of the coupling mechanism. The counterclockwise rotation may also bring the bores through the engaging lock into alignment with the biased pins on a back side thereof. The robot or tool arm may, thus, pull the proximal portion away from the tool portion and the bias pins may engage the back side of the engaging lock thereby securing it in position relative to the interfacing housing. (410)

Figure 23A:
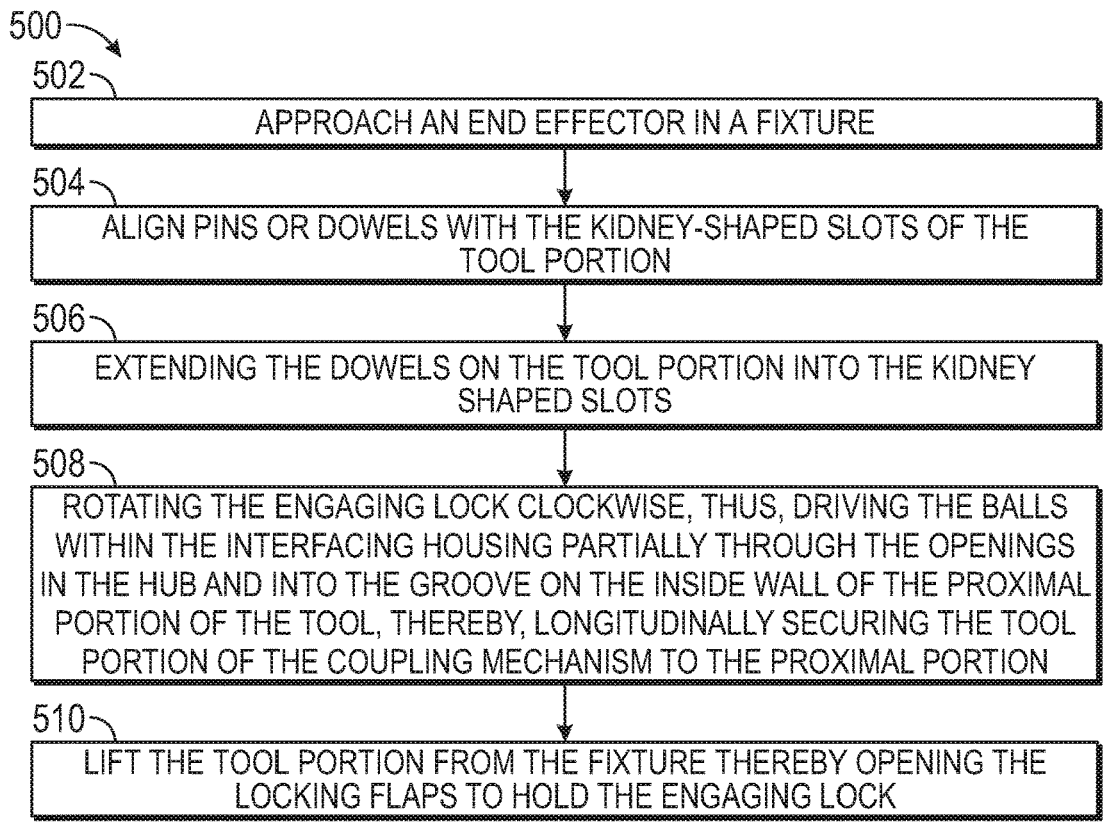
FIG. 23A is a method diagram depicting a method of engaging a tool, according to one or more embodiments.
Figure 23B:
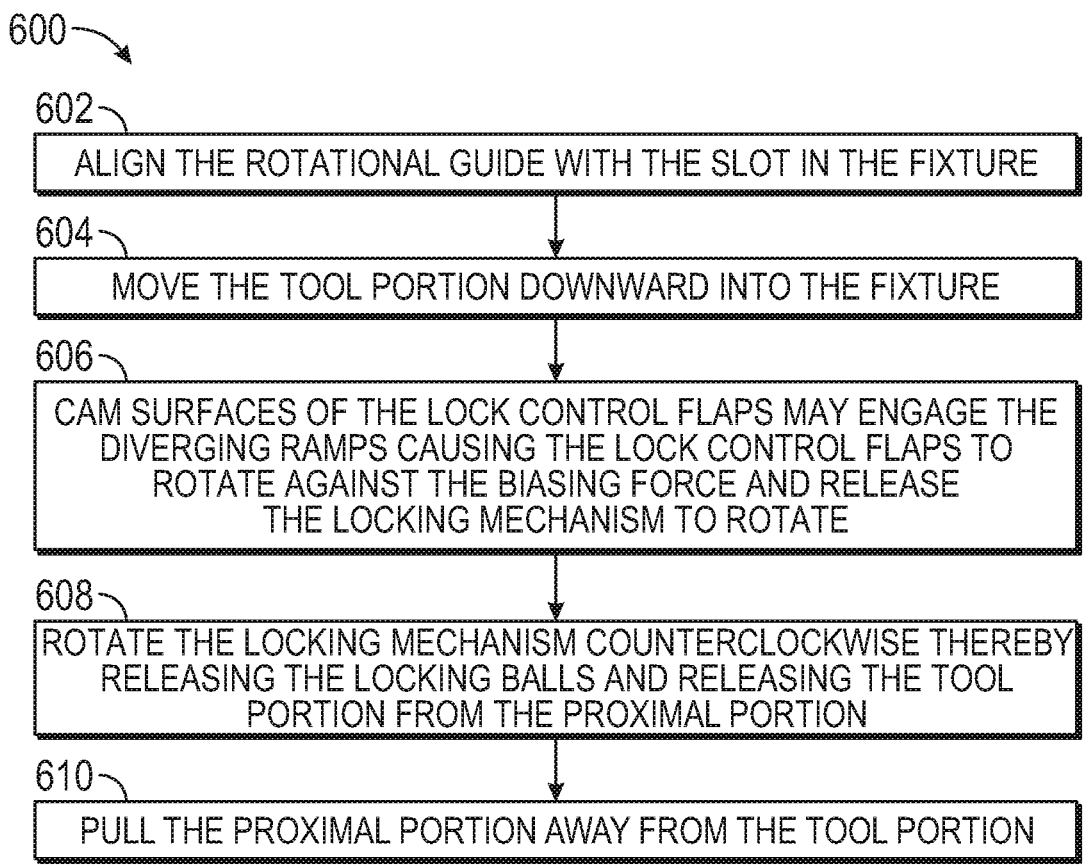
FIG. 23B is a method diagram depicting a method of disengaging a tool, according to one or more embodiments.

While a method of coupling 300 and decoupling 400 has been described with respect to the coupling mechanism 100, methods of coupling 500 and decoupling 600 may also be provided with respect to coupling mechanism 200 as shown in FIGS. 23A and 23B. For example, a robot or user may couple to an end effector or other tool using a method of coupling 500. A robot or user with a tool arm or other rotatable item may approach an end effector in a fixture (502). The robot or tool arm may include a proximal portion 202 of a coupling mechanism 200 secured to a wrist thereof and the end effector may be secured to or include the tool portion 204 of the coupling mechanism 200. As the robot or tool arm approaches, the pins or dowels extending from the proximal portion 202 of the coupling mechanism may be aligned with the kidney-shaped slots of the tool portion 204. (504) In particular, the dowels may be aligned with a counterclockwise end of the kidney-shaped slots. With the tool portion 204 in the fixture position, the engaging lock 230 of the tool portion 104 may be positioned in its most counterclockwise position when viewed from the front (most clockwise position when viewed from the back as in FIG. 18). Moreover, as shown, the lock control flaps may be pressed inward by the fixture against the biasing force, but the biting surface or point may be engaged with the inside surface of the tails of the locking mechanism 230. This may function to hold the locking mechanism 230 in position and ready for engagement by the proximal portion 202 when the tool portion 204 is in the fixture. Holding the locking mechanism 230 in this position when the tool portion 204 is in the fixture, may help to ensure that the locking balls 250 remain recessed in the openings 248 unless until the dowels are inserted and the lock 230 is actively rotated against the friction caused by the lock control flaps 243. That is, the robot or user may engage the tool portion 204 by extending the dowels on the tool portion into the kidney-shaped slots (506) rotating the engaging lock clockwise. (508) This may drive the balls within the interfacing housing partially through the openings in the hub and into the groove on the inside wall of the proximal portion of the tool thereby longitudinally securing the tool portion of the coupling mechanism to the proximal portion. It is to be appreciate that rotation of the tool portion 204 may be prevented and/or resisted by the downwardly extending rotational guide 269. With the proximal portion 202 secured to the tool portion 204, the robot or user may then lift the tool portion 204 from the fixture (510). It is to be appreciated that the downwardly extending rotational guide 269 may provide for prolonged rotational resistance of the tool portion 204 as the tool portion is lifted from the fixture 226. This may allow rotation of the tool portion 204 to be resisted long enough for the lock control flaps 243 to rise up along the lower set of ramps and open up to the position of FIG. 19 and hold the lock 230 in position against rotation through engagement of the flap noses 261 with the tails 275 of the lock 230. This may function to hold the locking balls 250 through the openings 248 and maintain a secured position of the tool portion 204.

To release or decouple from an end effector, the robot or user may perform a method of decoupling 600. For example, the robot or user may align the rotational guide 269 with the slot in the fixture (602) and move the tool portion 204 downward into the fixture (604). As the tool portion moves downward into the fixture, the guide ramps may help to center the tool portion in the fixture. As the tool portion moves further downward into the fixture, the cam surfaces of the lock control flaps may engage the diverging ramps causing the lock control flaps to rotated against the biasing force and release the locking mechanism 230 to rotate. (606) As such, once the tool portion is fully placed in the fixture, the robot or user may rotate the locking mechanism 230 counterclockwise (clockwise in FIG. 19) (608) to release the locking balls 150 and release the tool portion 204 from the proximal portion 202. The robot or user may then pull the proximal portion away from the tool portion leaving the tool portion behind in the fixture (610).

It is to be appreciated that the design features of the coupling mechanisms 100 and 200 allow the methods of coupling and decoupling to be actuated solely by movement of the robot components or a user's tool arm and, in particular, by twisting of the robot wrist or tool arm causing rotation of the engaging lock. As such, the coupling mechanisms 100 and 200 may be deemed a passive coupling mechanism because no outside actuation systems such as hydraulics, compressed air, or other force providing systems are relied on for actuation of the coupling mechanism. Nonetheless, a secure connection may be provided that is highly resistant to release and that provides for longitudinal rotational coupling to the robot or tool arm allowing for full manipulation and control of the end effector or other tool secured to the coupling mechanism.

In some embodiments, a pipe handling robot of the present disclosure may be arranged on a drilling rig, such as an on-shore or off-shore oil drilling rig. For example, a first robot may be arranged on or near the drill floor or such a rig, and a second robot may be arranged on or near a racking board of the rig. The robot(s) may operate to manipulate drill pipe during stand building, trip in, trip out, and/or other operations, as described in U.S. application Ser. No. 16/431,533, entitled Devices, Systems, and Methods for Robotic Pipe Handling, filed Jun. 4, 2019, the content of which is incorporated by reference herein in its entirety.

As used herein, the terms "substantially" or "generally" refer to the complete or nearly complete extent or degree of an action, characteristic, property, state, structure, item, or result. For example, an object that is "substantially" or "generally" enclosed would mean that the object is either completely enclosed or nearly completely enclosed. The exact allowable degree of deviation from absolute completeness may in some cases depend on the specific context. However, generally speaking, the nearness of completion will be so as to have generally the same overall result as if absolute and total completion were obtained. The use of "substantially" or "generally" is equally applicable when used in a negative connotation to refer to the complete or near complete lack of an action, characteristic, property, state, structure, item, or result. For example, an element, combination, embodiment, or composition that is "substantially free of" or "generally free of" an element may still actually contain such element as long as there is generally no significant effect thereof.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

Additionally, as used herein, the phrase "at least one of [X] and [Y]," where X and Y are different components that may be included in an embodiment of the present disclosure, means that the embodiment could include component X without component Y, the embodiment could include the component Y without component X, or the embodiment could include both components X and Y. Similarly, when used with respect to three or more components, such as "at least one of [X], [Y], and [Z]," the phrase means that the embodiment could include any one of the three or more components, any combination or sub-combination of any of the components, or all of the components.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

What is claimed is:

1. A coupling mechanism for securing a tool to a tool arm, comprising:
    a housing securable to the tool and configured for selective coupling to, and full release from, a body portion secured to the tool arm using an engaging lock arranged within the housing and configured for rotation by rotation of the tool arm and body portion relative to the housing;
    wherein:
        rotation of the engaging lock in a first direction drives locking mechanisms partially through the housing to engage the body portion to selectively couple the housing to the body portion thereby securing the tool to the tool arm; and
        rotation of the engaging lock in a second direction, opposite the first direction, releases the locking mechanisms fully releasing the housing from the body portion.

2. The coupling mechanism of claim 1, further comprising an end effector interface secured to the housing and configured for arrangement of an end effector thereon.

3. The coupling mechanism of claim 2, wherein the engaging lock is a generally star-shaped element.

4. The coupling mechanism of claim 3, wherein the star-shaped element comprises a plurality of ball sockets and sloping surfaces extending linearly from the ball sockets outward toward a peripheral edge.

5. The coupling mechanism of claim 1, further comprising a relative rotation lock system.

6. The coupling mechanism of claim 5, wherein the relative rotation lock system comprises a lock control flap biased in a holding position and configured to move to a release position when the coupling mechanism is placed in a fixture.

7. The coupling mechanism of claim 5, wherein the relative rotation lock system comprises an internal relative rotation system and an external relative rotation system.

8. The coupling mechanism of claim 7, wherein the internal relative rotation system comprises a biased pin configured to be released prior to engaging rotation of the engaging lock.

9. The coupling mechanism of claim 7, wherein the external relative rotation lock system comprises a biased pin configured to extend through the housing after engaging rotation of the engaging lock.

10. The coupling mechanism of claim 1, wherein the housing comprises a hub having a sidewall with a plurality of openings.

11. The coupling mechanism of claim 10, wherein the locking mechanisms are locking balls.

12. The coupling mechanism of claim 11, wherein rotation of the engaging lock drives the locking balls partially through respective ones of the plurality of openings.

13. The coupling mechanism of claim 1, wherein the housing comprises kidney-shaped slots for engaging the engaging lock.

14. The coupling mechanism of claim 1, further comprising the body portion comprising:
    an annularly shaped body with a front face and an inside wall; and
    a plurality of dowels extending from the front face.

15. The coupling mechanism of claim 14, wherein the inside wall comprises a groove configured for locking engagement by the locking mechanisms.

16. The coupling mechanism of claim 15, wherein the housing comprises a hub having a sidewall with a plurality of openings.

17. The coupling mechanism of claim 16, wherein the locking mechanisms comprise locking balls configured for to extend partially through the plurality of openings to engage the groove.

18. The coupling mechanism of claim 14, wherein the housing comprises a plurality of bores for receiving the plurality of dowels such that the dowels may engage the engaging lock.

19. A method of interchanging an end effector, comprising:
    engaging a tool portion of a coupling mechanism with a proximal portion secured to a tool arm, the tool portion arranged in a fixture and held against rotation and horizontal translation;
    rotating the proximal portion with the tool arm to activate an engaging lock;
    lifting the tool portion from the fixture; and
    engaging a relative rotation lock by the lifting.

20. The method of claim 19, wherein engaging a relative rotation lock by the lifting comprises releasing a force on a cam surface allowing a biasing force of a lock control flap to move the lock control flap into a holding position.

* * * * *